(12) United States Patent
Nishihara et al.

(10) Patent No.: US 7,072,100 B2
(45) Date of Patent: Jul. 4, 2006

(54) OPTICAL AMPLIFIER AND GAIN TILT COMPENSATION METHOD

(75) Inventors: Masato Nishihara, Kawasaki (JP); Yasushi Sugaya, Kawasaki (JP); Etsuko Hayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 307 days.

(21) Appl. No.: 10/103,751

(22) Filed: Mar. 25, 2002

(65) Prior Publication Data

US 2003/0039026 A1 Feb. 27, 2003

(30) Foreign Application Priority Data

Aug. 22, 2001 (JP) .............................. 2001-252165

(51) Int. Cl.
*H01S 3/00* (2006.01)

(52) U.S. Cl. .................... 359/337.2; 359/337.4

(58) Field of Classification Search ............. 359/337.2, 359/337.4
See application file for complete search history.

(56) References Cited

U.S. PATENT DOCUMENTS

| | | | |
|---|---|---|---|
| 5,668,659 A | 9/1997 | Sakamoto et al. .......... 359/341 |
| 5,912,750 A | 6/1999 | Takeda et al. | |
| 6,049,417 A | 4/2000 | Srivastava et al. .......... 359/341 |
| 6,141,142 A * | 10/2000 | Espindola et al. ..... 359/337.21 |
| 6,144,474 A | 11/2000 | Nitta et al. .................. 359/179 |
| 6,222,655 B1 | 4/2001 | Terahara ...................... 359/124 |
| 6,307,668 B1 * | 10/2001 | Bastien et al. ............ 359/337.1 |
| 6,362,917 B1 * | 3/2002 | Cordina et al. ........... 359/337.1 |
| 6,396,623 B1 * | 5/2002 | Wysocki et al. .......... 359/337.4 |
| 6,445,493 B1 * | 9/2002 | Kohnke et al. ........... 359/337.1 |

(Continued)

OTHER PUBLICATIONS

Becker et al. Erbium-Doped Fiber Amplifiers Fundamentals and Technology. Academic Press. 1999. pp. 266-268.*

(Continued)

*Primary Examiner*—Deandra M. Hughes
(74) *Attorney, Agent, or Firm*—Staas & Halsey LLP

(57) ABSTRACT

The optical amplifier realizes EDFA amplification of optical signals in new bands (the $S^+$- and S-bands), at wavelengths of 1450 to 1530 nm. The amplifier uses multiple erbium-doped fibers to amplify optical signals at wavelengths of 1450 to 1530 nm. Each of the multiple optical filters is interposed between the individual erbium-doped fibers. The sum of the transmission characteristics of the multiple filters is identical to an inverted EDF wavelength gain characteristic at wavelengths of 1450 to 1530 nm which is then shifted to the direction that the transmission increases.

34 Claims, 26 Drawing Sheets

U.S. PATENT DOCUMENTS

| | | | |
|---|---|---|---|
| 6,611,371 B1* | 8/2003 | Wigley et al. | 359/337.2 |
| 6,633,429 B1* | 10/2003 | Kinoshita et al. | 359/337.1 |
| 6,656,859 B1* | 12/2003 | Aitken et al. | 501/41 |
| 2002/0093727 A1* | 7/2002 | Krummrich | 359/337.1 |
| 2002/0124601 A1* | 9/2002 | Bandyopadhyay et al. | 65/390 |

OTHER PUBLICATIONS

Weik, Martin H. Fiber Optics Standard Dictionary. 3rd Edition. Chapman & Hall. 1997. p. 1055.*

Hamoir, D., et al., "Raman amplifier with a conversion efficiency in excess of 20%," reprinted from Optical Amplifiers and Their Applications Conference, 1999 Technical Digest, pp. 165-168 (English language translation).

Kasamatsu, T., et al., "Highly-Efficient Laser-Diode-Pumped Gain-Shifted Thulium-Doped Fiber Amplifier," Proceedings of the 2001 IECE General Conference, p. 310 Mar. 26-29, 2001 (including English translation).

U.S. Appl. No. 09/790,507, filed Feb. 23, 2001, Susumu Kinoshita et al.

EP Search Report for corresponding EP Application No. 02008122.0-2222. Jan. 4, 2005.

* cited by examiner

OPTICAL AMPLIFIER AND GAIN TILT COMPENSATION METHOD

BACKGROUND OF THE INVENTION

1. Field of the Invention

The present invention relates to an optical amplifier suitable for use in amplifying optical signals, particularly those in newly available bands, and for use in a wavelength-division multiplexing optical transmission system, in which multiple optical signals at different wavelengths are combined to be transmitted through one optical fiber. The invention also relates to a method for compensating for gain tilts (variations) across a range of wavelengths occurring in the present optical amplifier.

2. Description of the Related Art

In a wavelength-division multiplexing optical transmission system (optical transmission system), which transmits wavelength-division multiplexed optical signals at different wavelengths, an optical fiber transmission path reveals low (about 0.3 dB/km or smaller) transmission loss in a limited range of wavelengths from 1450 to 1650 nm. Various types of optical amplifiers have thus been developed to amplify optical signals in this range.

A Raman amplifier (discrete Raman amplifier, Raman fiberamplifier; RFA) is a commercially available example. It uses the Raman effect, which is a nonlinear effect in optical fibers, to amplify optical signals. Raman amplifiers employ optical fibers having high nonlinearity, such as dispersion-compensating fibers (DCFs) and highly nonlinear fibers (HNLFs).

Such a Raman amplifier is advantageous in that it can amplify optical signals at arbitrary wavelengths by selecting the wavelength of a pump beam, whereas it has a disadvantage of limited output power caused by nonlinear effects such as four-wave mixing. Additionally, when the Raman amplifier amplifies optical signals in the S-band, the wavelength of the pump beam falls in a range in which optical fibers exhibit greater loss, so that the amplification efficiency is impaired. Moreover, since gain per unit length is small, the Raman amplifier requires several to several tens of kilometers of fiber (optical amplifier medium) for optical amplification, making downsizing difficult.

Another type of amplifier is commercially available which amplifies optical signals by stimulated emission. The stimulated emission is caused by a population inversion in the energy formed by excitation within an optical amplifying fiber (optical amplifier medium). The following are examples.

As an optical fiber amplifier for amplifying optical signals at wavelengths of 1530 to 1560 nm {the 1550-nm band, the C-band (Conventional-wavelength band), an optical fiber amplifier (erbium-doped fiber amplifier; EDFA) that employs an erbium-doped fiber (EDF) has been developed. In addition, another type of erbium-doped fiber amplifier (gain-shifted erbium-doped fiber amplifier; GS-EDFA) has also been developed for amplifying optical signals at wavelengths of 1570 to 1600 nm {the 1580-nm band, which is the L-band (Longer-wavelength band)}.

As an optical fiber amplifier for amplifying optical signals at wavelengths of 1450 to 1490 nm (the $S^+$-band), there has already been provided an optical amplifier that employs a thulium-doped fiber (thulium-doped fluoride-based fiber amplifier; TDFA). The TDFA is a kind of rare-earth doped fiber amplifier which is advantageous in that it has a high level of output power, and in that it is capable of amplifying optical signals in the $S^+$-band, a range of wavelengths shorter than those of the S-band. The TDFA, however, has a disadvantage of reduced yield because of the use of a fluoride-based fiber, and its reliability is still rather poor.

Further, as a brand-new type of optical fiber amplifier for amplifying optical signals at wavelengths of 1475 to 1510 nm, a gain-shifted thulium-doped fluoride-based fiber amplifier has been under development. Even with such anew optical amplifier, it is still difficult to amplify optical signals at wavelengths of 1510 to 1530 nm, out of a band ranging from 1490 to 1530 nm {the S-band (the shorter-wavelength band)}.

With recent expansion of the market of wavelength-division multiplexing optical transmission systems, their further increment in capacity has long been desired.

Among the foregoing optical fiber amplifiers, an EDFA is a kind of rare-earth doped fiber amplifier which exhibits a good performance at amplifying optical signals in the C-band and the L-band, revealing a high level of output power. Additionally, it is free from the forgoing drawbacks in RFAs and TDFAs.

In an attempt to further increase the capacity of transmission, it has been expected that an EDFA having new optical amplification bands, one (the S-band) from 1490 to 1530 nm and the other (the $S^+$-band) from 1450 to 1490 nm, will be developed to expand the available transmission bands.

In order to amplify optical signals in the S-band and the $S^+$-band, the EDFA should employ an erbium-doped fiber made from multicomponent glass, or alternatively, the EDFA should operate in a state where the EDF maintains a high inversion rate in such a manner that gain could be obtained in the S-band and the $S^+$-band.

In the meantime, EDF has higher gain coefficients in the C-band than in the S-band or the $S^+$-band. Amplified spontaneous emission (ASE) in the C-band thus significantly grows, thereby impairing the efficiency of amplification in the S-band and the $S^+$-band. Moreover, gain tilts (variations), gain deviations between the shorter wavelengths and the longer wavelengths, are increased significantly in those bands.

In view of these, for accomplishing amplification of optical signals in the S-band and the $S^+$-band using an EDFA, the EDFA should operate at a high inversion rate to improve the amplification efficiency in the S-band and the $S^+$-band, and its gain characteristic should be flattened across a range of wavelengths.

To satisfy these requirements, the characteristics of optical filters should be optimized, the length of a single EDF should be optimized, or the number of EDFs should be optimized. Most importantly, the characteristics of optical filters should be optimized.

Further, even if this optimization achieves amplification of optical signals in the S-band and the $S^+$-band, it is still necessary to compensate with certainty for gain tilts caused by manufacturing errors of the optical filters or others.

Japanese Patent Application Publication No. 2000-124529 (United States Patent Application Publication No. US/2002/0001124) discloses an optical amplifier that includes multiple optical fiber amplifiers. In the application, there is given a description as if multiple optical filters alone, each of which is interposed between the individual optical fiber amplifiers, enable amplification of optical signals in the S-band. Only when there are such multiple EDFs and multiple optical filters each interposing therebetween, however, does it become practically impossible to amplify optical signals in the S-band or the $S^+$-band.

Meanwhile, though EDFAs have already achieved amplification of optical signals in the L-band, from 1570 to 1600 nm, there are still various problems caused by EDFs with the lengths of up to 50 m. One example of such problems is that the output power is significantly decreased when a longer-wavelength optical signal is input alone, in comparison with the case in which both a longer-wavelength optical signal and a shorter-wavelength optical signal are input together. Similarly, the increased length of EDFs might also be a problem in an attempt to amplify optical signals in the L$^+$-band, from 1610 to 1650 nm, by an EDFA.

SUMMARY OF THE INVENTION

With the foregoing problems in view, one object of the present invention is to provide an optical amplifier that uses EDFAs for amplifying optical signals in a new range of wavelengths, from 1450 to 1530 nm (the S-band and the S$^+$-band), in combination with optical filters whose characteristics are optimized.

Another object of the invention is to reduce the length of EDFs used in the EDFAs which amplify optical signals at wavelengths of 1570 to 1650 nm (the L-band and the L$^+$-band), so that various problems due to the increased length of EDFs can be solved.

A further object of the invention is to provide a method for reliably compensating for deviations, if any, in optical amplifier gain obtained by the present optical amplifier.

In order to accomplish the above object, according to the present invention, there is provided an optical amplifier which amplifies optical signals at a range of wavelengths from 1450 to 1530 nm. The optical amplifier comprises: a plurality of erbium-doped fibers; and a plurality of optical filters, each of which is interposed between the individual erbium-doped fibers. The plural optical filters, as a whole, have a gross transmission characteristic identical to that which is to be obtained by inverting a wavelength gain characteristic of the erbium-doped fiber in the 1450 to 1530 nm band and then shifting the resulting inverted characteristic in a direction that transmission increases.

As a preferred feature, each one of the plural optical filters has a transmission characteristic such that it transmits a pump beam, equalizes optical signal gain across the 1450 to 1530 nm band, and blocks amplified spontaneous emission at wavelengths longer than 1530 nm.

As one generic feature, there is provided an optical amplifier which amplifies optical signals at a range of wavelengths from 1570 to 1650 nm. The optical amplifier comprises: a plurality of erbium-doped fibers; and a plurality of optical filters, each of which is interposed between the individual erbium-doped fibers. The plural optical filters, as a whole, have a gross transmission characteristic identical to that which is to be obtained by inverting a wavelength gain characteristic of the erbium-doped fiber in the 1570 to 1650 nm band and then shifting the resulting inverted characteristic in a direction that transmission increases.

As another preferred feature, each one of the plural optical filters has a transmission characteristic such that it transmits a pump beam, equalizes optical signal gain across the 1570 to 1650 nm band, and blocks amplified spontaneous emission at wavelengths shorter than 1570 nm.

As another generic feature, there is provided an optical amplifier, comprising: a plurality of rare-earth element doped fibers; and a plurality of optical filters each interposed between the individual rare-earth doped fibers. The individual optical filter has a transmission characteristic that is identical to an inversion of a wavelength gain characteristic of the one of the rare-earth element doped fibers which precedes the last-specified optical filter.

As a further generic feature, there is provided an optical amplifier, comprising: a plurality of rare-earth element doped fibers; and a plurality of optical filters each interposed between the individual rare-earth doped fibers. The plural optical filters have a common transmission characteristic and also have a gross transmission characteristic, or the sum of the transmission characteristics of the plural optical filters, which is substantially identical to an inversion of a gross gain characteristic of the plural rare-earth element doped fibers.

The optical amplifier of the present invention guarantees the following advantageous results.

(1) Using erbium-doped fiber (rare-earth doped fiber) amplifiers, it is possible to amplify a new range of wavelengths, from 1450 to 1530 nm, by optimizing the characteristics of optical filters equipped in the present optical amplifier;

(2) Since it is possible to reduce the length of erbium-doped fiber employed in an optical amplifier which amplifies optical signals at wavelengths of 1570 to 1650 nm, various problems due to an increased length of erbium-doped fiber can be removed.

(3) If optical filters number less by one than erbium-doped fibers, the optical amplifier can be improved in amplification efficiency, even yielding a slightly impaired noise figure (NF).

(4) If the optical amplifier has optical filters as many as erbium-doped fibers, the optical amplifier can be improved in NF, even yielding impaired amplification efficiency.

(5) If the erbium-doped fibers in the optical amplifier are made from fluoride glass or tellurite glass, it is possible to obtain even greater gain.

(6) With use of erbium-doped fiber made of a core doped with erbium and cladding surrounding the core, which cladding is doped with rare-earth ions or transition metal ions (Tm, Sm, Dy, Tb, Nd, Pm, Pr, Co, or Cu) so as to absorb 1550 nm-band light emitted from the core, it is possible to improve the amplifier efficiency.

In addition, as another generic feature, there is provided an optical transmission system comprising the foregoing optical amplifier.

As still another generic feature, there is provided a method for compensating for gain tilts (variations) in the foregoing optical amplifier. The method comprises any one of the following steps of: adjusting the length of at least one of the erbium-doped fibers; adjusting the temperature of at least one of the erbium-doped fibers; adjusting the pressure applied to at least one of the erbium-doped fibers; and disposing a Raman amplifier prior to the optical amplifier.

The gain tilt compensation method of the present invention is advantageous in that tilts, if any, in gain obtained by the foregoing optical amplifier can be reliably compensated for.

As additional preferred feature, the present method comprises the step of adjusting the length, the temperature, and/or the pressure, of the last one or the foremost one of the plural erbium-doped fibers.

As a still further generic feature, there is provided an optical amplifier, comprising: a plurality of rare-earth element doped fibers; and a plurality of optical filters each interposed between the individual rare-earth doped fibers. The individual optical filter has a transmission characteristic that is identical to an inversion of a wavelength gain characteristic of the one of the rare-earth element doped fibers which precedes the last-specified optical filter.

As an additional generic feature, there is provided an optical amplifier, comprising: a plurality of rare-earth element doped fibers; and a plurality of optical filters each interposed between the individual rare-earth doped fibers. The plural optical filters have a common transmission characteristic, and also have a gross transmission characteristic, or the sum of the transmission characteristics of the plural optical filters, which is substantially identical to an inversion of a gross gain characteristic of the plural rare-earth element doped fibers.

Other objects and further features of the present invention will be apparent from the following detailed description when read in conjunction with the accompanying drawings.

BRIEF DESCRIPTION OF THE DRAWINGS

FIG. 31 is a plot of NF characteristics in a case where gain tilts caused by the manufacture errors of the optical filters are compensated for.

DESCRIPTION OF THE PREFERRED EMBODIMENT(S)

Preferred embodiments of the present invention will now be described hereinbelow with reference to the relevant accompanying drawings.

Each optical filter of a first embodiment of the present invention has functions for: transmitting emitted light (a pump beam; at wavelengths of e.g., 970 to 990 nm, particularly at 980 nm); compensating for gain tilts —gain deviations between the shorter wavelengths and the longer wavelengths—across an optical signal band (e.g., the S-band, at wavelengths of 1480 to 1520 nm); and blocking spontaneous emission (e.g., at wavelengths of 1520 nm or longer) other than the optical signals (a function for blocking, in particular, the peak value of amplifier gain)

Each optical filter of a second embodiment of the present invention has functions for: transmitting a pump beam (e.g., at wavelengths of 970 to 990 nm, particularly at 980 nm); compensating for gain tilts across an optical signal band (e.g., the L-band, at wavelengths of 1570 to 1600 nm); and for blocking spontaneous emission (e.g., at wavelengths of 1570 nm or shorter) other than the optical signals (a function for blocking, in particular, the peak value of amplifier gain).

[1] First Embodiment

With reference to FIG. 1 through FIG. 31, and FIG. 36 through FIG. 39, a description will be made hereinbelow of an optical amplifier and a method for compensating for gain tilts of the optical amplifier according to a first embodiment of the present invention.

Figure 7:
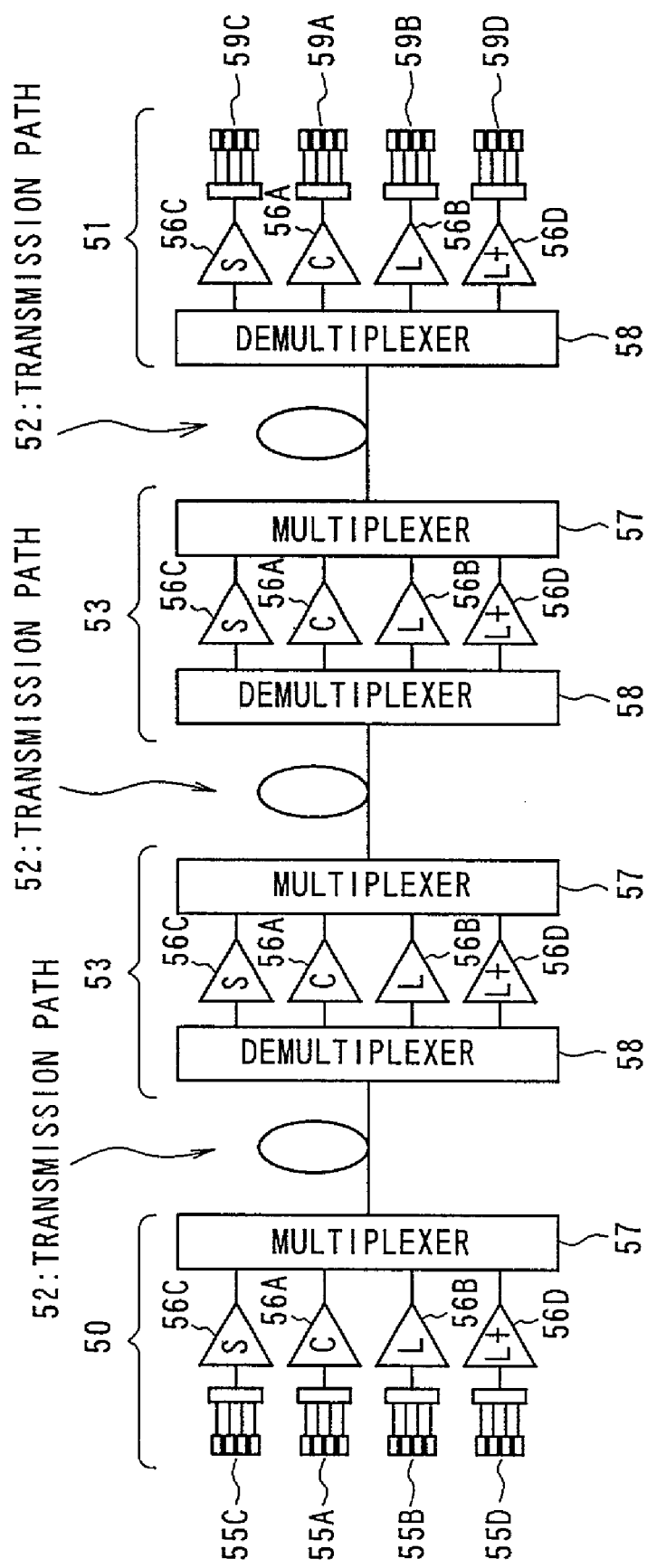
FIG. 7 is a schematic view of an optical signal transmission system that includes optical amplifiers of the first embodiment.

Referring now to FIG. 7, a description will be made hereinbelow of an optical signal transmission system {wavelength-division multiplexing (WDM) optical signal transmission system} with multiple transmission channels, each of which is equipped with an optical amplifier of the present embodiment.

Figure 8:
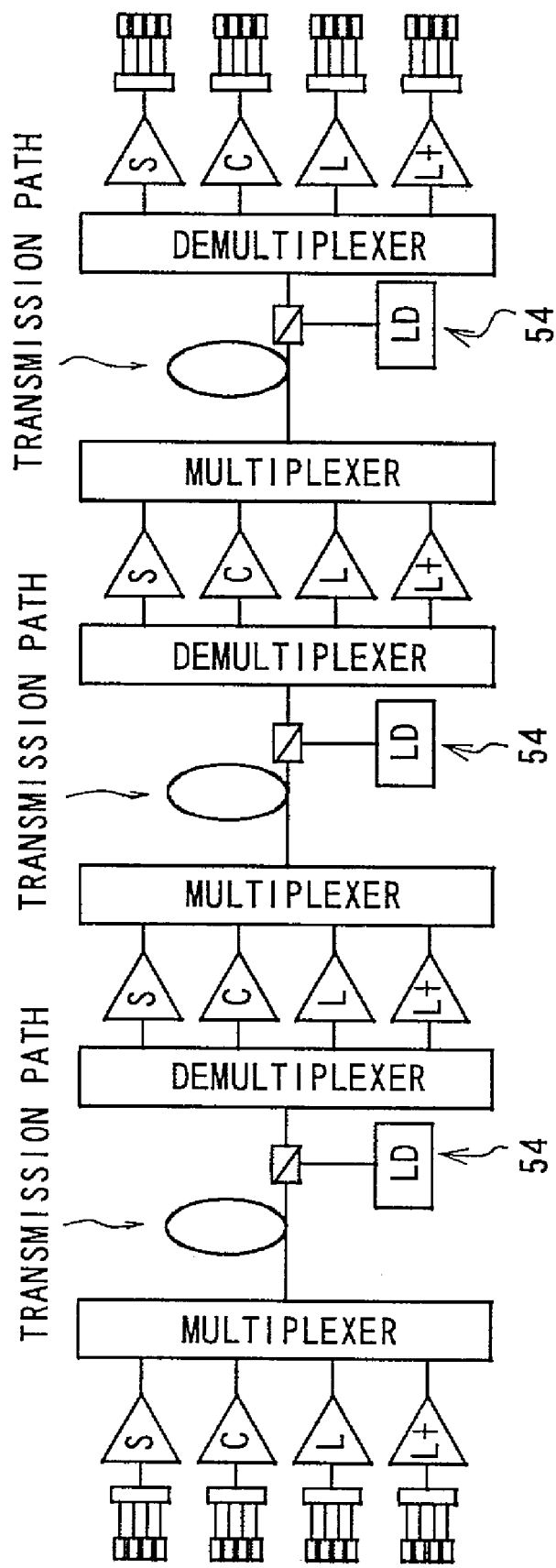
FIG. 8 is a schematic view of an optical signal transmission system that includes optical amplifiers of the first embodiment.

As shown in FIG. 7, the system has an end terminal (transmitting unit) (hereinafter called transmitter terminal) 50 on the transmitter side, another end terminal (receiving unit) (hereinafter called receiver terminal) 51 on the receiver side, optical fiber transmission path 52 interconnecting between transmitter terminal 50 and receiver terminal 51, and two or more optical repeater terminals (optical repeaters, repeater amplifiers) 53 disposed along optical fiber transmission path 52. As shown in FIG. 8, the system may include distributed Raman amplifier 54.

Transmitter terminal 50 includes: multiple optical transmitters 55A through 55D, each of which transmits optical signals at different wavelengths; multiple optical amplifiers 56A through 56D, one for each band, for amplifying the optical signals transmitted from optical transmitters 55A through 55D, respectively; and multiplexer (optical multiplexer) 57 which performs wavelength-division multiplexing of the multiple optical signals to create wavelength-division multiplexed optical signals (WDM optical signals), and then outputs the WDM optical signals to optical fiber transmission path 52.

Optical transmitter 55A is an optical transmitter dedicated to the C-band (hereinafter called C-band optical transmitter) for transmitting optical signals at different wavelengths in the C-band, from 1530 to 1560 nm (the 1550-nm band). Optical transmitter 55B is an optical transmitter dedicated to the L-band (hereinafter called L-band optical transmitter) for transmitting optical signals at different wavelengths in the L-band, from 1570 to 1600 nm.

Optical amplifier 56A is an optical amplifier dedicated to the C-band (hereinafter called C-band optical amplifier) for amplifying optical signals in the C-band. Optical amplifier 56B is an optical amplifier dedicated to L-band (hereinafter called L-band optical amplifier) for amplifying optical signals in the L-band.

C-band optical amplifier 56A and L-band optical amplifier 56B, erbium-doped fiber amplifiers, which have already been commercially available as described in the description of the related art, can be used, and any other types of optical amplifiers may also be used.

In order to further increase the capacity of communications, optical transmitter 55C and optical amplifier 56C are provided in the present embodiment. Optical transmitter 55C is an optical transmitter dedicated to the S-band (hereinafter called S-band optical transmitter) for transmitting optical signals at different wavelengths in the S-band, from 1490 to 1530 nm. Optical amplifier 56C is an optical amplifier dedicated to the S-band (hereinafter called S-band optical amplifier) for amplifying optical signals in the S-band. The details of S-band optical amplifier 56C will be described later.

Likewise, for the purpose of further increasing the capacity of communications, optical transmitter 55D and optical amplifier 56D are provided in the present embodiment. Optical transmitter 55D is an optical transmitter dedicated to the $L^+$-band (hereinafter called $L^+$-band optical transmitter) for transmitting optical signals at different wavelengths in the $L^+$-band, from 1610 to 1650 nm. Optical amplifier 56D is an optical amplifier dedicated to the $L^+$-band (hereinafter called $L^+$-band optical amplifier) for amplifying optical signals in the $L^+$-band. $L^+$-band optical amplifier 56D can be realized by, for example, a Raman amplifier.

In addition to C-band optical amplifier 56A (and C-band optical transmitter 55A) and L-band optical amplifier 56B (and L-band optical transmitter 55B), S-band optical amplifier 56C (and S-band optical transmitter 55C) and $L^+$-band optical amplifier 56D (and $L^+$-band optical transmitter 55D) are provided to transmit not only optical signals in the C-band and those in the L-band but also optical signals in the S-band and those in the $L^+$-band, thereby increasing the capacity of communications. The present invention should by no means be limited to this, and $L^+$-band optical amplifier 56D (and $L^+$-band optical transmitter 55D) is not necessarily required. With such a construction, it is possible to increase the capacity of communications in the present system, in comparison with conventional systems in which only optical signals in the C-band and in the L-band are multiplexed.

Further, the WDM optical signal transmission system may have C-band optical amplifier 56A (and C-band optical transmitter 55A) and S-band optical amplifier 56C (and S-band optical transmitter 55C) to transmit wavelength-division multiplexed optical signals in the C-band and in the S-band. Still further, the WDM optical signal transmission system may have L-band optical amplifier 56B (and L-band optical transmitter 55B) and S-band optical amplifier 56C (and S-band optical transmitter 55C) to transmit wavelength-division multiplexed optical signals in the L-band and in the S-band. Furthermore, in an attempt to further increase the capacity of communications, the present system may have an optical transmitter dedicated to the $S^+$-band (hereinafter called $S^+$-band optical transmitter) for transmitting optical signals at different wavelengths in the $S^+$-band, from 1450 to 1490 nm, and an optical amplifier dedicated to the $S^+$-band (hereinafter called $S^+$-band optical amplifier) for amplifying optical signals in the $S^+$-band.

Receiver terminal 51 has demultiplexer (optical demultiplexer) 58, optical amplifiers 56A through 56D, and optical receivers 59A through 59D. A demultiplexer 58 takes WDM optical signals transmitted through optical fiber transmission path 52, and demultiplexes the WDM signals into the composite bands. Optical amplifiers 56A through 56D, one for each band, amplify the optical signals thus separated by demultiplexer 58. Optical receivers 59A through 59D receive the individual optical signals at different wavelengths.

Optical receiver 59A is an optical receiver dedicated to the C-band (hereinafter called C-band optical receiver) for receiving optical signals at different wavelengths in the C-band. Optical receiver 59B is an optical receiver dedicated to the L-band (hereinafter called L-band optical receiver) for receiving optical signals at different wavelengths in the L-band.

Optical amplifier 56A is a C-band optical amplifier for amplifying optical signals in the C-band. Optical amplifier 56B is a L-band optical amplifier for amplifying optical signals in the L-band.

As these C-band optical amplifier 56A and L-band optical amplifier 56B, erbium-doped fiber amplifiers, which have already been commercially available as described in the description of the related art, can be used, and any other types of optical amplifiers may also be used.

In order to further increase the capacity of communications, S-band optical receiver 59C and S-band optical amplifier 56C are provided in the present embodiment. S-band optical receiver 59C is an optical receiver dedicated to the S-band (hereinafter called S-band optical receiver) for receiving optical signals at different wavelengths in the S-band. S-band optical amplifier 56C amplifies optical signals in the S-band. The details of S-band optical amplifier 56C will be described later.

Likewise, for the purpose of even further increasing the capacity of communications, $L^+$-band optical receiver 59D and $L^+$-band optical amplifier 56D are provided in the present embodiment. $L^+$-band optical receiver 59D is an optical receiver dedicated to the $L^+$-band (hereinafter called $L^+$-band optical receiver) for receiving optical signals at different wavelengths in the $L^+$-band. $L^+$-band optical amplifier 56D amplifies optical signals in the $L^+$-band. $L^+$-band optical amplifier 56D can be realized by, for example, a Raman amplifier.

In addition to C-band optical amplifier 56A (and C-band optical receiver 59A) and L-band optical amplifier 56B (and L-band optical receiver 59B), S-band optical amplifier 56C (and S-band optical receiver 59C) and $L^+$-band optical amplifier 56D (and $L^+$-band optical receiver 59D) are provided to transmit not only optical signals in the C-band and those in the L-band but also optical signals in the S-band and those in the $L^+$-band, thereby increasing the capacity of communications. The present invention should by no means be limited to this, and $L^+$-band optical amplifier 56D (and $L^+$-band optical receiver 59D) is not necessarily required. With such a construction, it is possible to increase the capacity of communications in the present system, in comparison with conventional systems in which only optical signals in the C-band and in the L-band are multiplexed.

Further, the WDM optical signal transmission system may have C-band optical amplifier 56A (and C-band optical receiver 59A) and S-band optical amplifier 56C (and S-band optical receiver 59C) to transmit wavelength-division multiplexed optical signals in the C-band and in the S-band. Still further, the WDM optical signal transmission system may have L-band optical amplifier 56B (and L-band optical transmitter 59B) and S-band optical amplifier 56C (and S-band optical receiver 59C) to transmit wavelength-division multiplexed optical signals in the L-band and in the S-band.

Furthermore, in an attempt to further increase the capacity of communications, the present system may have an optical receiver dedicated to the $S^+$-band (hereinafter called $S^+$-band optical receiver) for receiving optical signals at different wavelengths in the $S^+$-band, from 1450 to 1490 nm, and also a $S^+$-band optical amplifier for amplifying optical signals in the $S^+$-band.

Each optical repeater terminal 53 includes multiple optical amplifiers 56A through 56D. Prior to the set of optical amplifiers 56A through 56D, there is provided a demultiplexer (optical demultiplexer) 58, which takes WDM optical signals transmitted through optical fiber transmission path 52 and demultiplexes the WDM signals into the composite bands. Subsequently to the set of optical amplifiers 56A through 56D, a multiplexer (optical multiplexer) 57 is disposed which performs wavelength-division multiplexing of the multiple optical signals to create wavelength-division multiplexed optical signals (WDM optical signals) and then outputs the WDM optical signals onto optical fiber transmission path 52.

A demultiplexer 58 takes WDM optical signals transmitted through optical fiber transmission path 52, and demultiplexes the WDM signals into the composite bands. Optical amplifiers 56A through 56D, one for each band, then amplify the optical signals. After combining the optical signals, multiplexer 57 sends out the combined signals on the fiber transmission path 52.

Each optical repeater terminal 53 includes C-band optical amplifier 56A for amplifying optical signals in the C-band and also L-band optical amplifier 56B for amplifying optical signals in the L-band. As these C-band optical amplifier 56A and L-band optical amplifier 56B, erbium-doped fiber amplifiers, which have already been commercially available as described in the description of the related art, can be used, any other types of optical amplifiers may also be used.

In order to further increase the capacity of communications, S-band optical amplifier 56C for amplifying optical signals in the S-band is provided in the present embodiment. The details of S-band optical amplifier 56C will be described later.

Likewise, for the purpose of further increasing the capacity of communications, $L^+$-band optical amplifier 56D for amplifying optical signals in the $L^+$-band is provided in the present embodiment. $L^+$-band optical amplifier 56D can be realized by, for example, a Raman amplifier.

In addition to C-band optical amplifier 56A and L-band optical amplifier 56B, S-band optical amplifier 56C and $L^+$-band optical amplifier 56D are provided to transmit not only optical signals in the C-band and those in the L-band but also optical signals in the S-band and those in the $L^+$-band, thereby increasing the capacity of communications. The present invention should by no means be limited to this, and $L^+$-band optical amplifier 56D is not necessarily required. With such construction, it is possible to increase the capacity of communications in the present system, in comparison with conventional systems in which only optical signals in the C-band and in the L-band are multiplexed.

Further, the WDM optical signal transmission system may have C-band optical amplifier 56A and S-band optical amplifier 56C to transmit wavelength-division multiplexed optical signals in the C-band and in the S-band. Still further, the WDM optical signal transmission system may have L-band optical amplifier 56B and S-band optical amplifier 56C to transmit wavelength-division multiplexed optical signals in the L-band and in the S-band.

Furthermore, in an attempt to further increase the capacity of communications, the present system may have an $S^+$-band optical amplifier for amplifying optical signals at different wavelengths in the $S^+$-band, from 1450 to 1490 nm.

Figure 9:
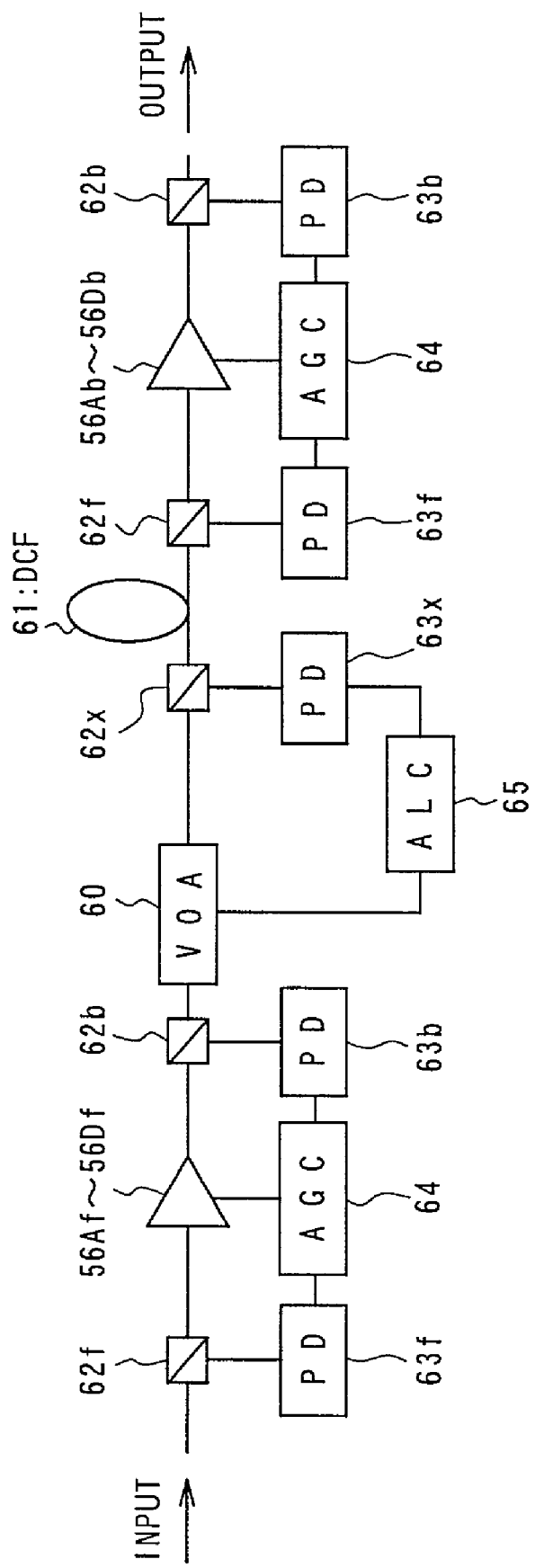
FIG. 9 is a schematic view of a control system of an optical amplifier of the first embodiment.

Referring now to FIG. 9, each of optical amplifiers 56A through 56D, equipped in transmitter terminal 50, receiver terminal 51, and individual optical repeater terminals 53, consists of a pair of amplifiers for realizing two-stage amplification: first-stage amplification is carried out by optical amplifiers 56Af through 56Df; and second-stage amplification is carried out by optical amplifiers 56Ab through 56Db. Between the first-stage amplifier, 56Af through 56Df, and the second-stage amplifier, 56Ab through 56Db, variable optical attenuator (VOA) 60 and dispersion compensation fiber (DCF) 61 are provided.

It is desirable that optical signals be amplified with an increased degree of efficiency (the ratio of optical signal output power to pump beam power) and a lower noise figure (NF). The above-mentioned two-stage structure meets such requirements. Optical amplifiers 56Af through 56Df lower the NF, and optical amplifiers 56Ab through 56Db increase the degree of efficiency.

Gain-constant control for maintaining constant gain is performed on the optical amplifiers, 56Af through 56Df and 56Ab through 56Db.

For this purpose, as shown in FIG. 9, optical beam splitter 62f (optical splitter/coupler) is disposed prior to the first-stage optical amplifier, 56Af through 56Df, and the second-stage amplifier, 56Ab through 56Db, so as to monitor the power (input power) of input optical signals input to the individual optical amplifiers, 56Af through 56Df and 56Ab through 56Db. Optical beam splitter 62f splits off part (monitor beam) of the input optical signals to photodiode (PD, input monitor PD, photodetector) 63f.

Likewise, for monitoring the power (output power) of output optical signals output from the individual optical amplifiers, 56Af through 56Df and 56Ab through 56Db, optical beam splitter 62b (optical splitter/coupler) is disposed after the first-stage optical amplifier, 56Af through 56Df, and the second-stage optical amplifier, 56Ab through 56Db. Optical beam splitter 62b splits off part (monitor beam) of the input signal to photodiode (PD, output monitor PD, photodetector) 63b.

Automatic gain control circuit (automatic gain controller; AGC) 64 controls an output (pump beam power) of a pump bean emitter according to an output from input-monitoring PD 63f and that of output-monitoring PD 63b, thereby executing gain-constant control (amplification rate constant control), so that amplifier gain of each optical amplifier, 56Af through 56Df and 56Ab through 56Db, maintains a uniform level.

Further, the output power of the first-stage optical amplifier, 56Af through 56Df, is controlled to maintain a uniform level (output level constant control). As a result, even when the gain-constant control is performed on the optical amplifier, 56Af through 56Df and 56Ab through 56Db, an output of the optical amplifier, 56Af through 56Df and 56Ab through 56Db, is controlled to keep a uniform level.

For attaining these, variable optical attenuator (VOA) 60 is provided between the first-stage optical amplifier, 56Af through 56Df, and the second-stage optical amplifier, 56Ab through 56Db (that is, on the output end of the first-stage optical amplifier, 56Af through 56Df). VOA 60 can alternatively be disposed on the input end of the first-stage optical amplifier, 56Af through 56Df.

Optical beam splitter (optical splitter/coupler) 62x is provided subsequently to VOA 60. Optical beam splitter 62x splits off part (monitor beam) of the optical signal to photodiode (PD, monitor PD, photodetector) 63x.

Automatic level control circuit (automatic level controller; ALC) 65 controls the amount of loss caused by VOA 60 according to an output of monitor PD 63x, thereby controlling the output power of the optical amplifier, 56Af through 56Df, to maintain a uniform value.

Figure 10:
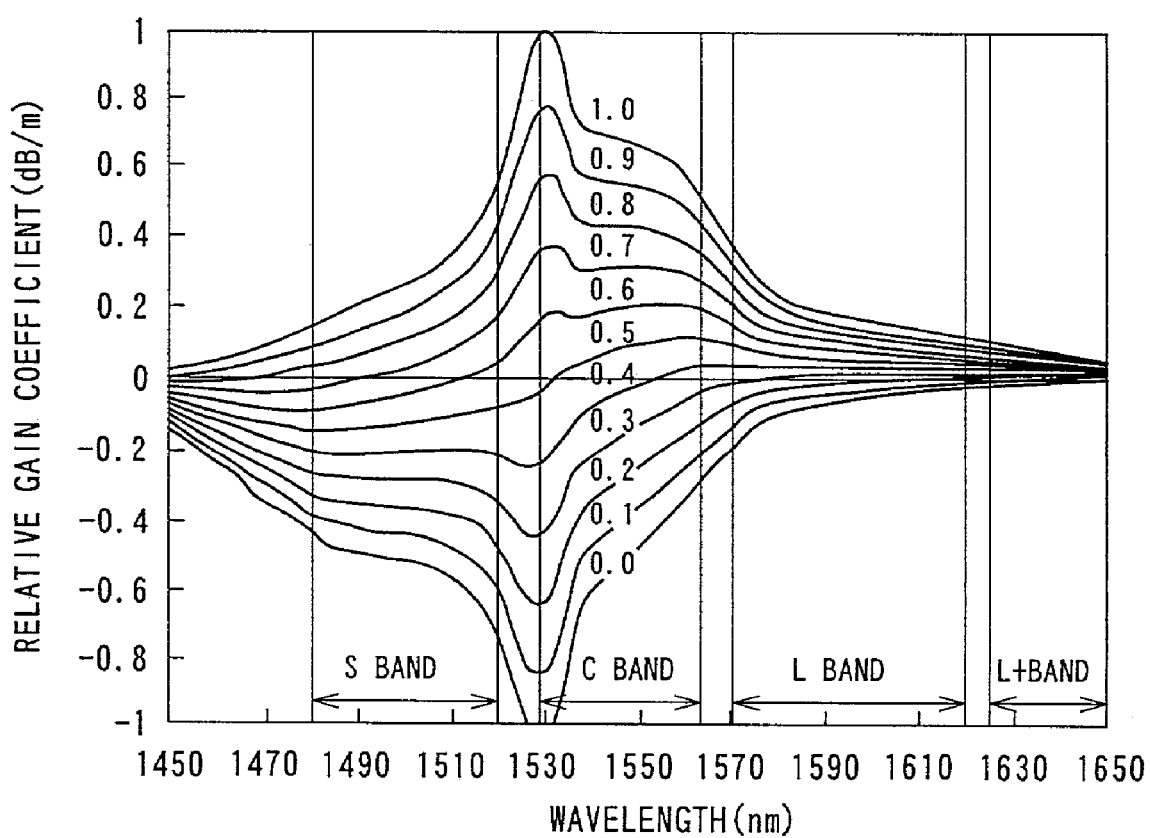
FIG. 10 is a plot of a wavelength gain characteristic of an erbium-doped fiber (EDF) equipped in an optical amplifier of the first embodiment.

As described above, an erbium-doped fiber amplifier (EDFA) serves as C-band optical amplifier 56A and L-band optical amplifier 56B. As shown in FIG. 10, an erbium-doped fiber (EDF) used in the EDFA has different wavelength gain characteristics—a wavelength-dependent gain characteristic expressed by a relative gain coefficient—for different inversion rates. Accordingly, when serving as C-band optical amplifier 56A or L-band optical amplifier 56B, the EDF must be excited according to the band being used, thereby realizing a desired inversion rate at which the EDF should operate.

FIG. 10 shows wavelength gain characteristics of a silica EDF (silica glass EDF) for different population inversions. In FIG. 10, gain is expressed by relative gain coefficients, which are normalized values of gain per unit length. The inversion rate indicates the proportion of excited erbium ions. For example, with all the erbium ions being excited (all the electrons are excited to an upper level), the inversion rate takes a value of 1.0, whereas with no erbium ions being excited (all the electrons are in the base ground), the inversion rate takes a value of 0.0.

For example, an EDFA, serving as the above-described C-band optical amplifier 56A, should operate in a state in which it is excited up to an inversion rate of, e.g., around 0.7 in such a manner that its amplifier band is the 1550-nm band (from 1530 to 1570 nm). Even using a range of wavelengths that reveals the peak gain, flat gain having no wavelength-dependency should be realized with a combined use of, for example, a gain-equalizer.

An EDFA, serving as the above-described L-band optical amplifier 56B, should operate in a state in which it is excited up to an inversion rate of, e.g., around 0.4, so as to obtain the gain having a flat shape whose peak value per unit length of EDF appears in the L-band. In this case, the length of the EDF is increased to obtain the desired gain.

In the meantime, if an EDF operates at a high inversion rate, it is possible to obtain gain in the S-band as well as the C-band and L-band. For example, in FIG. 10, the wavelength gain characteristic at an inversion rate of 0.9 exhibits high gain in the S-band, a range of wavelengths from 1490 to 1530 nm.

At that time, since the relative gain coefficient of the EDF in the C-band is greater than that in the S-band, amplified spontaneous emission (ASE) in the C-band also significantly grows even when optical signals in the S-band are amplified. As a result, amplification efficiency in the S-band is impaired, and tilts in optical signal gain across the S-band are significantly increased.

In view of these, the amplification efficiency in the S-band is required to be improved by blocking the ASE in the C-band, and also, tilts in optical signal gain across the S-band are required to be removed by flattening the wavelength gain characteristic across the S-band.

S-band optical amplifier 56C of the present embodiment is thus structured in such a way that it contains optical filters which are designed to meet the requirements.

Referring now to FIG. 11 through FIG. 31, S-band optical amplifier 56C will be described in detail hereinbelow.

Figure 11:
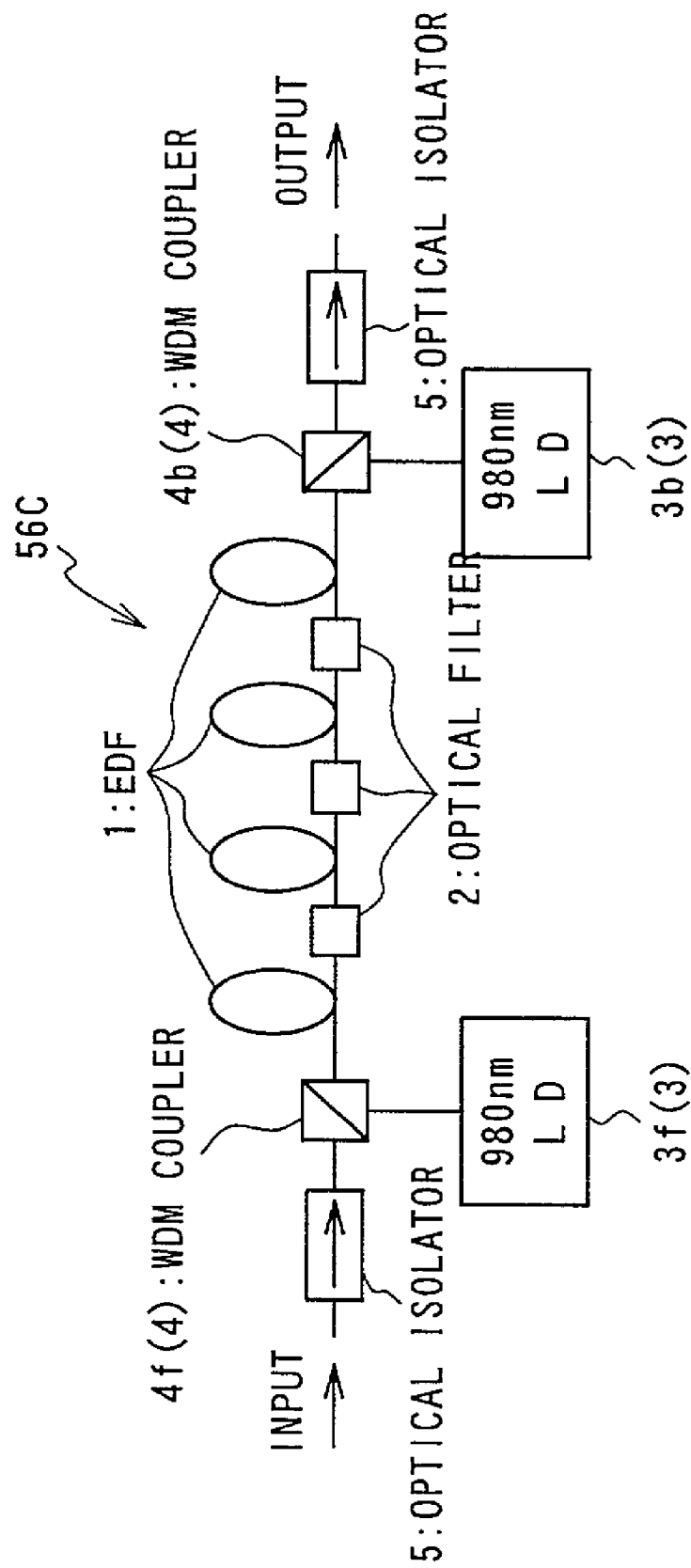
FIG. 11 is a schematic view of an optical amplifier of the first embodiment.

S-band optical amplifier (optical amplifier, optical fiber amplifier) 56C of the present embodiment is an erbium-doped fiber amplifier (EDFA). As shown in FIG. 11, S-band optical amplifier 56C has multiple erbium-doped fibers (EDFs, rare-earth element doped fibers) 1, multiple optical filters 2 each interposed between the individual EDFs 1, pump beam emitter 3 for supplying a pump beam (for example, a laser beam at 980 nm) to EDF 1, and wavelength-division multiplexing coupler (WDM coupler) 4 for introducing the pump beam into EDF 1. In addition, optical isolators 5 are provided both on the optical signal input end (prior to the set of EDFs) and on the optical signal output end (subsequently to the set of EDFs) to remove light reflected from the optical components.

Note that a couple of S-band optical amplifiers 56C, one for the first-stage amplification and the other for the second-stage amplification, are prepared to realize a two-stage amplification. Since the first-stage optical amplifier 56Cf has a structure similar to that of the second-stage optical amplifier 56Cb, the first-stage optical amplifier 56Cf (or the second-stage optical amplifier 56Cb) represents the said couple of S-band fiber amplifiers.

The present embodiment employs four EDFs 1, and the length of one EDF (EDF length, fiber length) is 4 m, although the number of EDFs 1 and the length of an EDF should by no means be limited to 1 and 4 m. In practical use, there should be 10 EDFs or fewer.

Following are the reasons why EDFs 1 number four and the EDF length is 4 m in the present embodiment.

Figure 12:
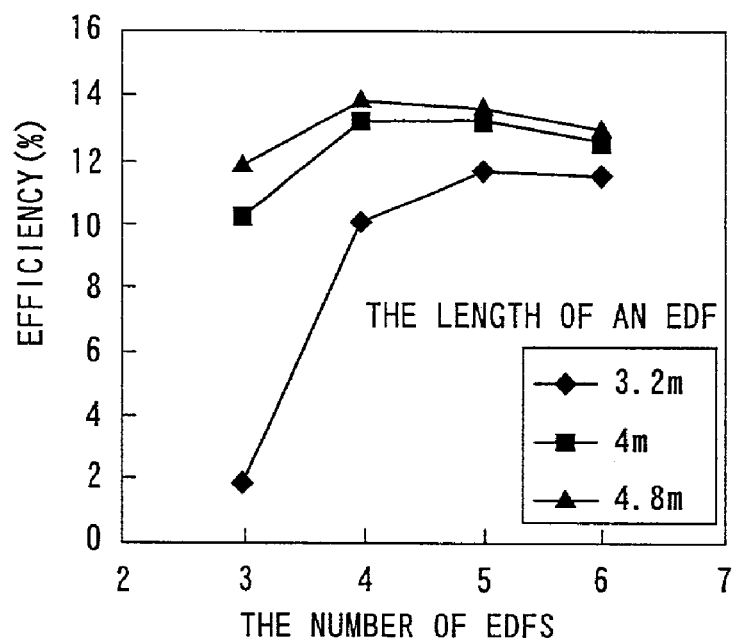
FIG. 12 is a plot of efficiency vs. the number of EDFs in an optical amplifier of the first embodiment for a variety of lengths of EDFs.

FIG. 12 shows the efficiency of an EDF with the lengths of 3.2 m, 4 m, and 4.8 m as a parameter. In view of the relationship among the efficiency, the number of EDFs, and the length of an EDF, a 3.2-m EDF reveals slightly inferior efficiency, and a 4-m EDF and a 4.8-m EDF reveal almost the same efficiency. The efficiency differs significantly between a case where three EDFs are used and a case where four EDFs are used, whereas efficiency shows no significant difference with four or more EDFs. Note that FIG. 12 merely shows a tendency of efficiency under a certain condition, not a universal one.

Figure 13:
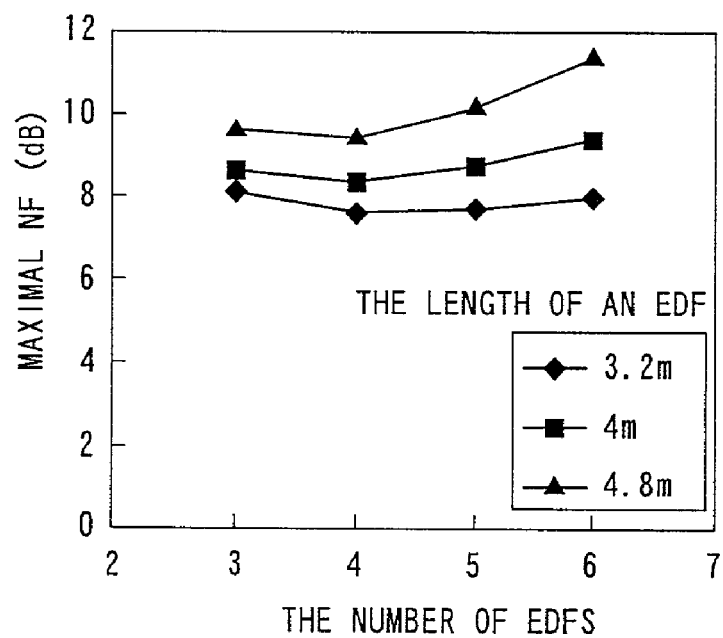
FIG. 13 is a plot of maximal NF vs. the number of EDFs in an optical amplifier of the first embodiment for a variety of lengths of EDFs.

Referring now to FIG. 13, in view of the relationship among the maximal NF, the number of EDFs, and the length of an EDF, the maximal NF does not significantly depend on the number of EDFs. With an EDF length of 4.8 m, the maximal NF reveals a slightly increased value, but with an EDF length of 4 m, the value falls within a permissible range. FIG. 13 merely shows a tendency of the maximal NF under a certain condition, not a universal one.

In the present embodiment, EDF 1 is a silica EDF (silica glass EDF) generally available. In that case, the EDF 1 should have a mode field diameter ranging from 5 to 8 µm, and the density of erbium Er should be from 100 to 1500 ppm. An EDF 1 with a mode field diameter of 7 µm and with an Er density of 500 ppm is an example.

It is more preferable to use a fluoride glass EDF than a silica EDF for attaining improved gain (amplification efficiency) in the S-band, so that EDF 1 becomes more suitable for use in the S-band.

Figure 14:
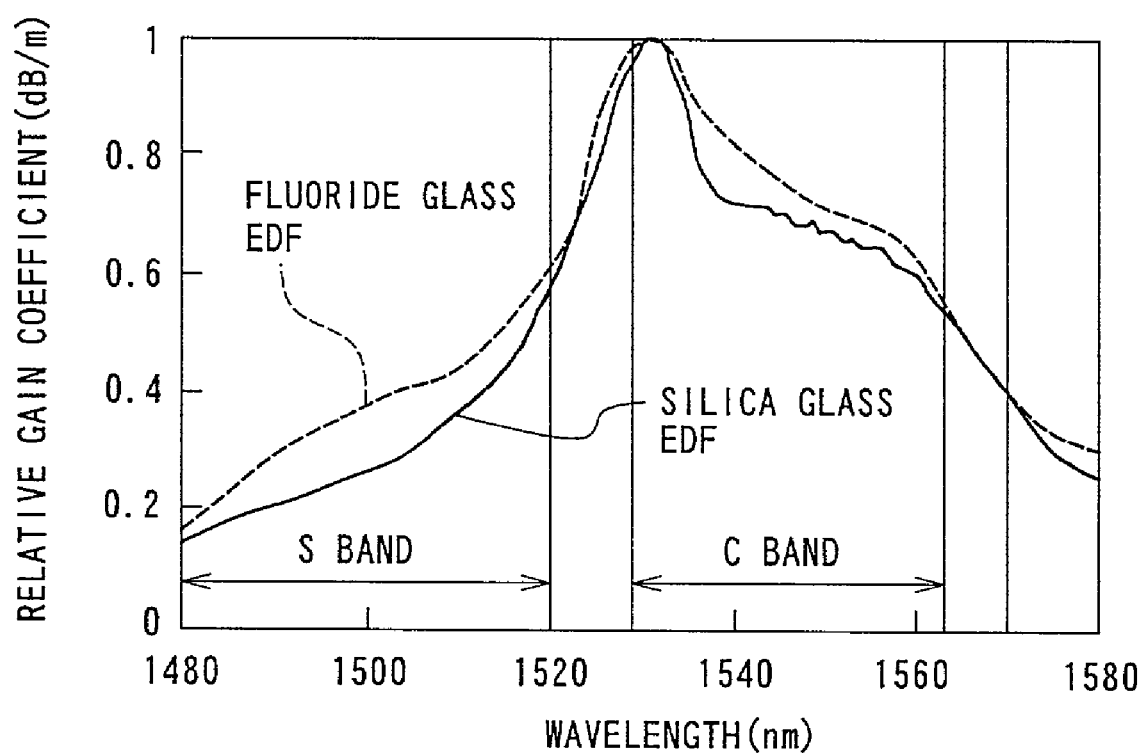
FIG. 14 is a plot for use in description of EDFs employed in an optical amplifier of the first embodiment.
Figure 15:
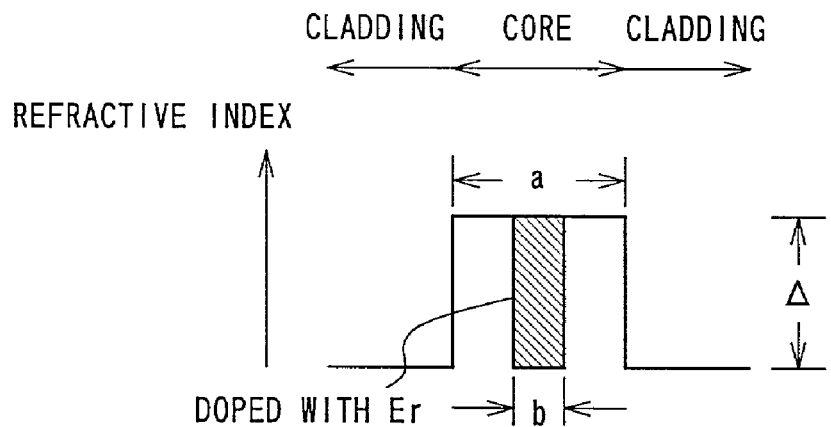
FIG. 15 is a view for describing the improvement of the efficiency of EDFs in an optical amplifier of the first embodiment.

FIG. 14 illustrates a wavelength gain characteristic of a silica EDF (silica glass EDF) and that of a fluoride glass EDF.

As shown in FIG. 14, gain coefficients of fluoride glass EDF in the S-band are greater than those of silica glass EDF, revealing that the fluoride glass EDF has greater S-band gain (amplification efficiency) than that of the silica glass EDF.

Further, the S-band gain depends upon the materials from which the EDF's host glass is made. In comparison with silicate, it is reported that such materials as tellurite, germanate, and gallate, realize greater S-band gain (see e.g., edited by Dan Hewak, "Properties, Processing and Application of Glass and Rare Earth-Doped Glasses for Optical Fibers"). For this reason, it appears to be preferable to use tellurite, germanate, or gallate as the host glass material.

In order to increase the efficiency (to realize efficient use of the pump beam power), the following method can be utilized.

To optimize the structure of EDF 1 is one of the possible methods. Specifically, referring now to FIG. 15, a relative index difference α (the difference between the refractive index of the cladding of EDF 1 and that of the core of the EDF 1) takes a high value (e.g., $\Delta \geqq 1.6\%$), and the ratio of the diameter a of the core to the diameter b of the erbium-doped part (Er-doped part) is decreased (e.g., $b/a \geqq 0.7$), so that the pump beam is strongly confined within the core, thereby increasing the inversion rate so as to improve the efficiency.

Figure 16:
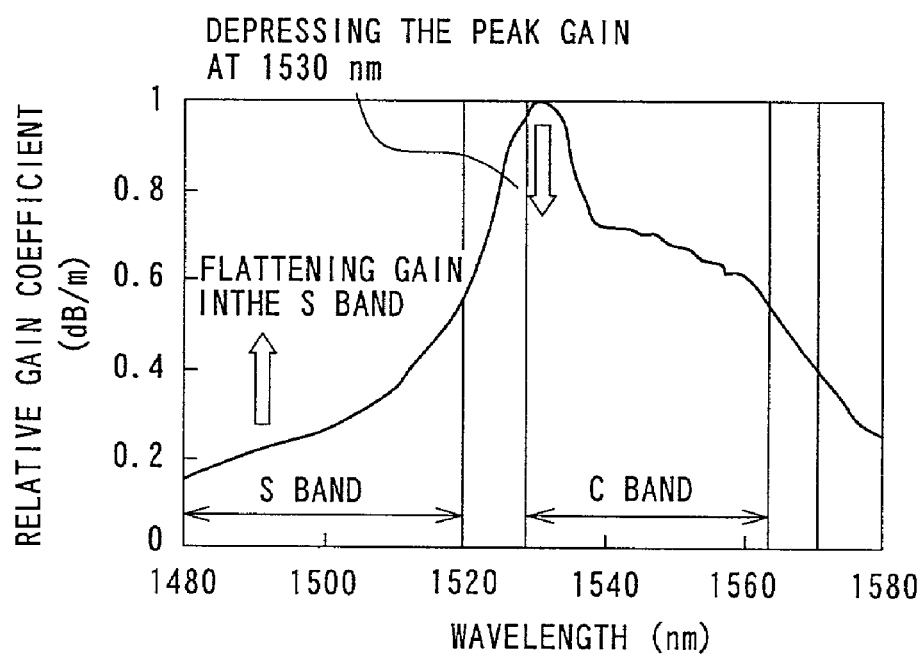
FIG. 16 is a plot for describing the improvement of the efficiency of EDFs in an optical amplifier of the first embodiment.

Another method is to optimize the wavelength gain characteristic of EDF 1. As indicated by the following formula:

Gain coefficients at 1450 to 1528 nm/gain coefficient at 1530 nm>0.2, the ratios of relative gain coefficients at 1450 to 1528 nm to a relative gain coefficient at 1530 nm should take values of greater than 0.2. As a result, as shown in FIG. 16, the wavelength gain characteristic of EDF 1 can be optimized in such a way that its peak at a wavelength of 1530 is depressed, and that the gain is flattened across the S-band, thereby increasing the efficiency.

Figure 17:
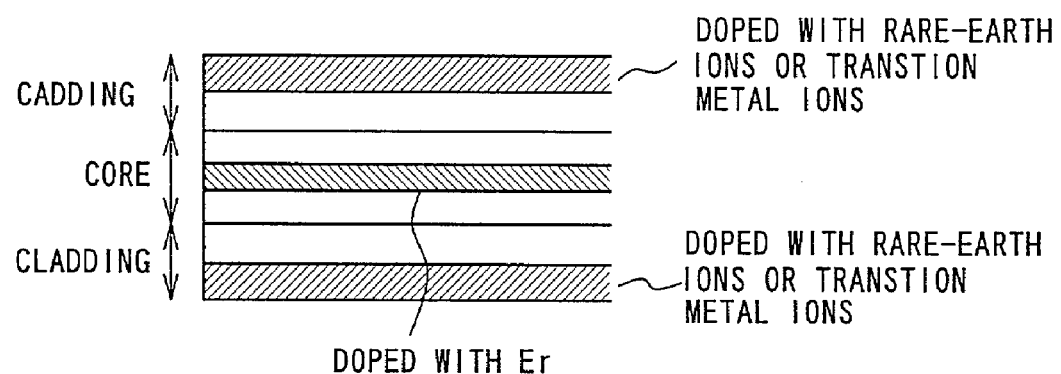
FIG. 17 is a view for describing the improvement of the efficiency of EDFs in an optical amplifier of the first embodiment.
Figure 18:
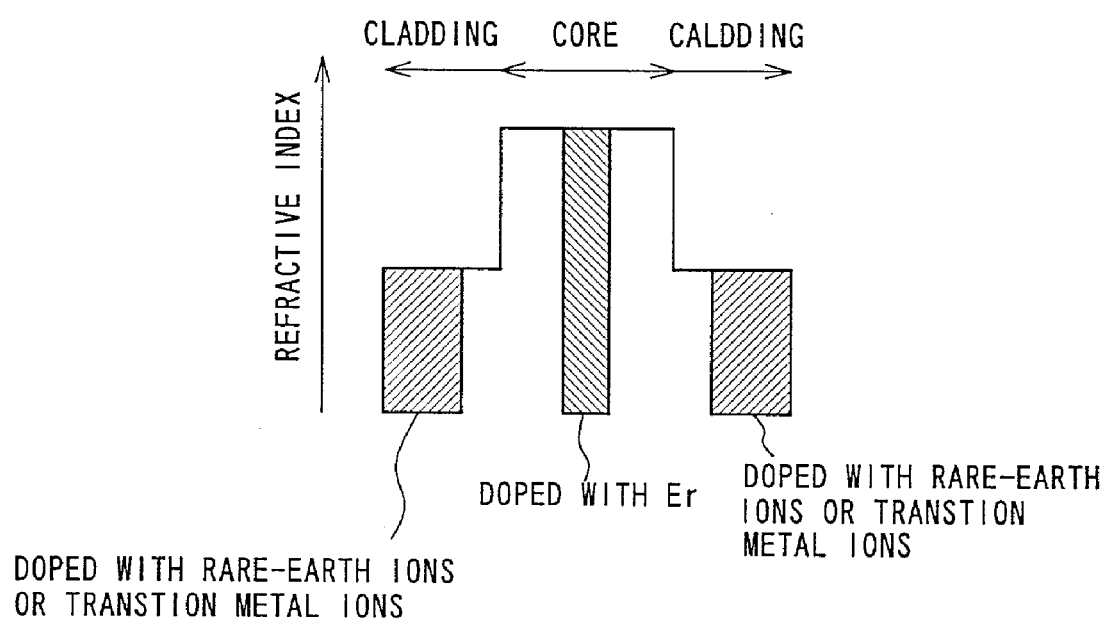
FIG. 18 is a view for describing the improvement of the efficiency of EDFs in an optical amplifier of the first embodiment.

Further, yet another method for increasing the efficiency is to absorb amplified spontaneous emission (ASE) into the cladding of EDF 1. Referring now to FIG. 17 and FIG. 18, EDF 1 is made of a core doped with erbium ions (Er ions) and cladding doped with rare-earth ions (e.g., Tm, Sm, Dy, Tb, Nd, Pm, and Pr) or transition metal ions (e.g., Co and Cu). The cladding absorbs ASE in the 1550-nm band (from 1530 to 1560 nm; the C-band) emitted from the core, thereby increasing the efficiency. In FIG. 17 and FIG. 18, the part doped with erbium is designated as "doped with Er" (Er-doped part); the part doped with rare-earth ions or transition metal ions is designated as "doped with rare-earth ions or transition metal ions".

Figure 19:
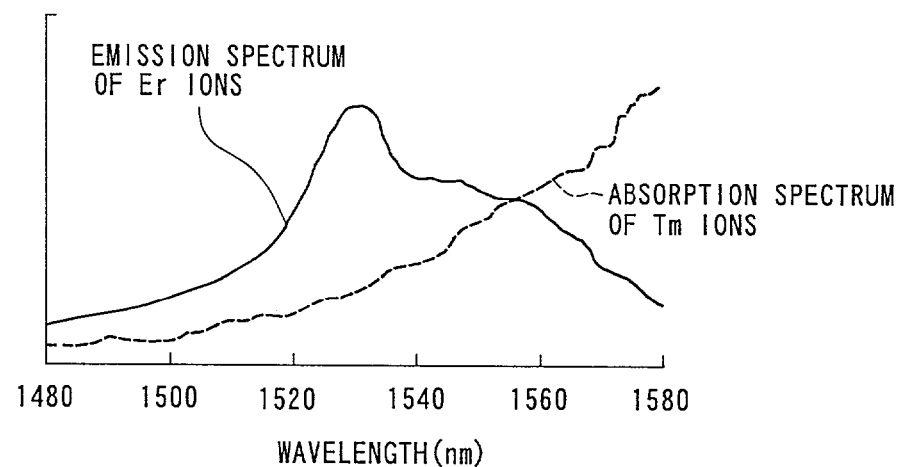
FIG. 19 is a plot for describing the improvement of the efficiency of EDFs in an optical amplifier of the first embodiment.

FIG. 19 illustrates an emission spectrum of erbium ions (Er ions) and an absorption spectrum of Tm ions as rare-earth ions.

As shown in FIG. 19, the longer the wavelength, the greater the absorption spectrum of Tm ions. Thus Tm ions absorb light more in the C-band than in the S-band. With such a characteristic, the S-band light emitted from Er ions in the core is not absorbed significantly, but the C-band ASE emitted from Er ions in the core is absorbed significantly by Tm ions in the cladding, so that the efficiency is improved.

A description will be made hereinbelow of optical filter 2 that features in the present embodiment.

In the present embodiment, optical filter 2 is given the following characteristics (1) through (3).

(1) optical filter 2 transmits a pump beam in the 980-nm band, a range of wavelengths from 970 to 990 nm. This is because the pump beam at a wavelength of 980 nm guarantees a high inversion rate which is required to amplify the S-band optical signals.

(2) optical filter 2 blocks ASE at wavelengths of 1530 nm or longer (particularly in the C-band). Note that "to block" means here that the absorption (loss) of the ASE amounts to 25 dB or greater. This characteristic is given for the purpose of improving the amplification efficiency in the S-band.

As shown in FIG. 10, EDF 1 has a gain that peaks at a wavelength of around 1530 nm. Accordingly, the loss at around 1530 nm due to optical filter 2 takes an important role to sufficiently suppress the ASE. Here, with increase in operation gain of EDF 1 or increase in the length of a single EDF 1, the ASE power to be generated is increased, and the required loss at around 1530 nm is also increased. In view of these, the loss at around 1530 nm due to optical filter 2 should be determined in accordance with the operation gain of EDF 1 and the length of a single EDF. For example, in S-band optical amplifier 56C with five 4-m EDFs operating at a gain of 15 dB, a required loss at around 1530 nm amounts to 25 dB.

(3) Optical filter 2 equalizes the optical signal gain across the 1490 to 1530 nm band. Optical filter 2 might be regarded as a gain equalizer (GEQ) because it has such a gain-equalizing characteristic. This characteristic is given for flattening the wavelength gain characteristic across the S-band, from 1490 to 1530 nm, to reduce the optical signal gain tilts (variations) across the S-band.

Figure 3:
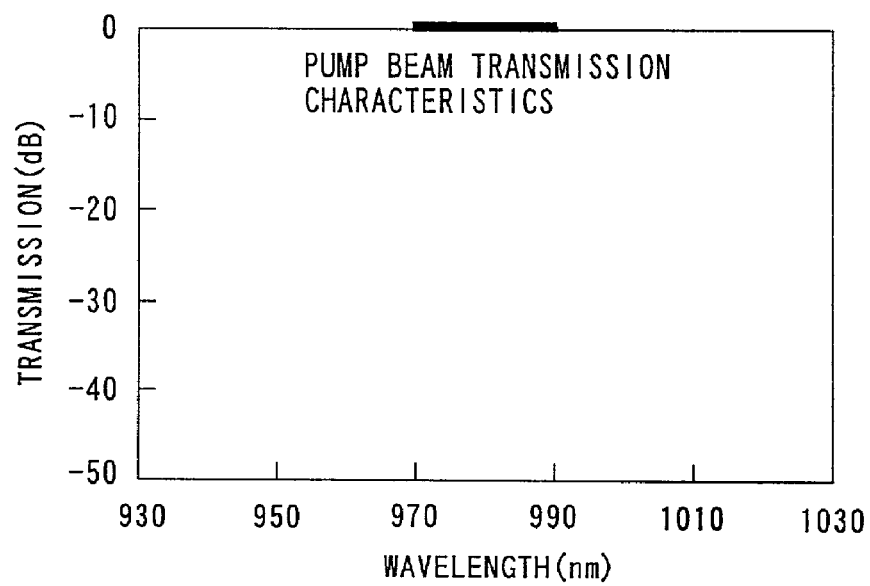
FIG. 3 is a plot of a transmission characteristic of each optical filter equipped in an optical amplifier of the first embodiment, in a wavelength range from 930 to 1030 nm.
Figure 4:
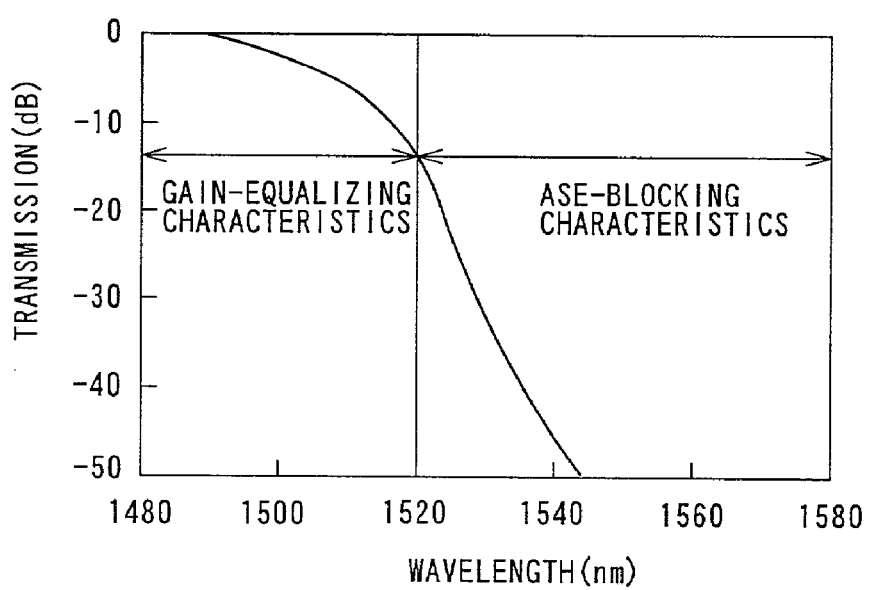
FIG. 4 is a plot of a transmission characteristic of each optical filter equipped in an optical amplifier of the first embodiment, in a wavelength range from 1480 to 1580 nm.

As shown in FIG. 3 and FIG. 4, optical filter 2 given the foregoing characteristics (1) through (3) has the following wavelength-dependant characteristic of transmission rate: the transmission rate maintains a value of approximately 0 dB across the 980-nm band, allowing a 980-nm pump beam to pass thorough optical filter 2; and the longer the wavelength, the smaller the transmission rate becomes across the range of wavelengths from about 1480 nm to about 1545 nm, gradually from a transmission rate of 0 dB (increases in negative values).

Concretely, any one of the kinds of filters, such as dielectric multilayer filters, etalon filters, fiber grating filters, rare-earth doped fiber filters, and active gain equalizers, is preferred for use as optical filter 2, or otherwise, any combination of these kinds are also preferable.

Figure 1:
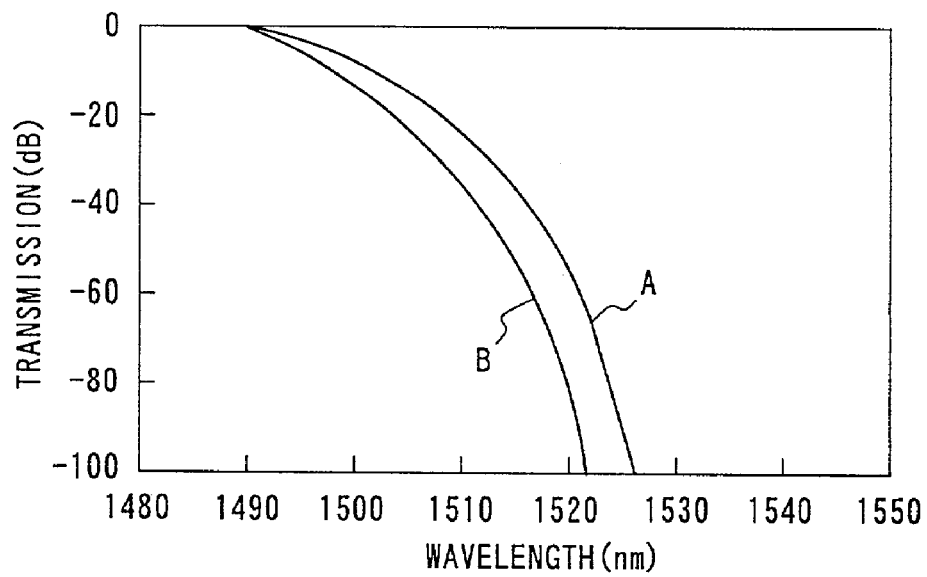
FIG. 1 is a plot of the sum of transmission characteristics of optical filters equipped in an optical amplifier according to a first embodiment of the present invention.

In particular, multiple optical filters 2 interposed between individual EDFs (five 4-m EDFs; the sum of the EDF lengths is 20 m) 1, as a whole, exhibit a gross transmission characteristic, which is the sum of the transmission characteristics of multiple optical filters 2. As shown in FIG. 1, the shape of the gross transmission characteristic (designated by solid line A in FIG. 1) of the multiple optical filters 2 is identical to an inversion (an inversion of the amplification characteristics of the EDFs; designated by the solid line B in FIG. 1) of the wavelength gain characteristic (a transmission characteristic of silica EDF that should appear at an inversion rate of 0.9) of the multiple EDFs 1 in the approximately 1480 to 1530 nm band (including the S-band), and the gross transmission characteristic is shifted in the direction that the transmission rate increases (in the direction that the transmission rate approaches a value of 0 dB) in such a way that from at a wavelength of 1490 nm, the transmission rate increases gradually as the wavelength increases. As in the plot of FIG. 1, there is no shift at a wavelength of approximately 1490 nm; there is such a shift that the transmission rate is increased by about 7 dB at approximately 1500 nm; there is such a shift that the transmission rate is increased by about 15 dB at approximately 1510 nm; and there is such a shift that the transmission rate is increased by about 40 dB at approximately 1520 nm.

The following are the reasons why the sum of the transmission characteristics of the multiple optical filters 2 is made to have such a shape as is plotted by solid line A in FIG. 1, and why the multiple optical filters 2 are distributed between the individual EDFs 1.

Figure 2:
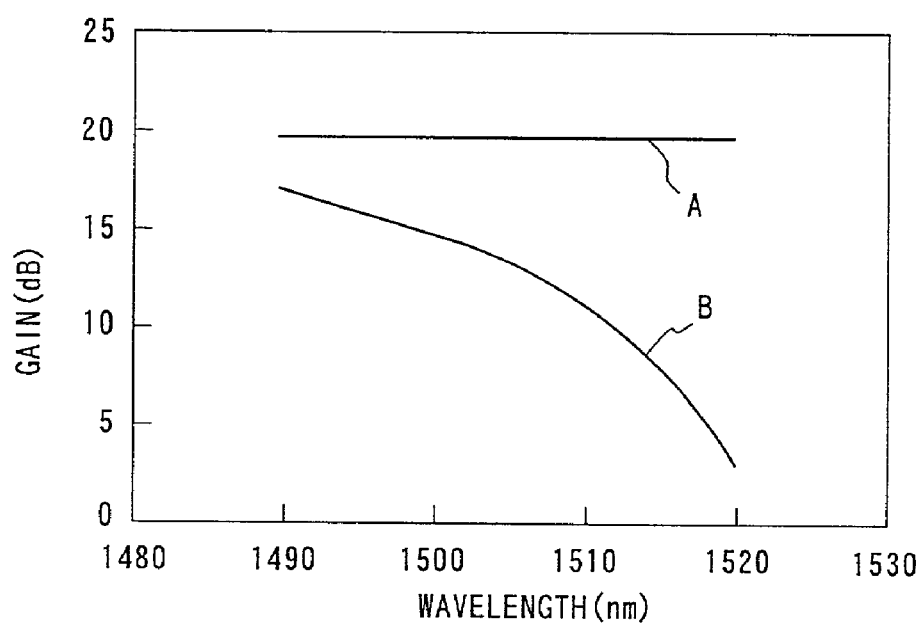
FIG. 2 is a plot of amplifier gain of an optical amplifier of the first embodiment.

Provided that the sum of the transmission characteristics of the multiple optical filters 2 is determined to have such a shape as shown by solid line B of FIG. 1, and that the multiple optical filters 2 are disposed between the individual EDFs 1, the longer the wavelength becomes in the range of 1490 to 1520 nm, the more the gain decreases as shown by solid line B of FIG. 2, so that the output gain varies across the range of wavelengths.

In the meantime, provided that the sum of the transmission characteristics of the multiple optical filters 2 is determined to have such a shape as shown by solid line A of FIG. 1, and that the multiple optical filters 2 are disposed between the individual EDFs 1, the output amplifier gain of S-band optical amplifier (EDFA) 56C is made flat across the range of wavelengths, as shown by solid line A of FIG. 2.

Figure 5:
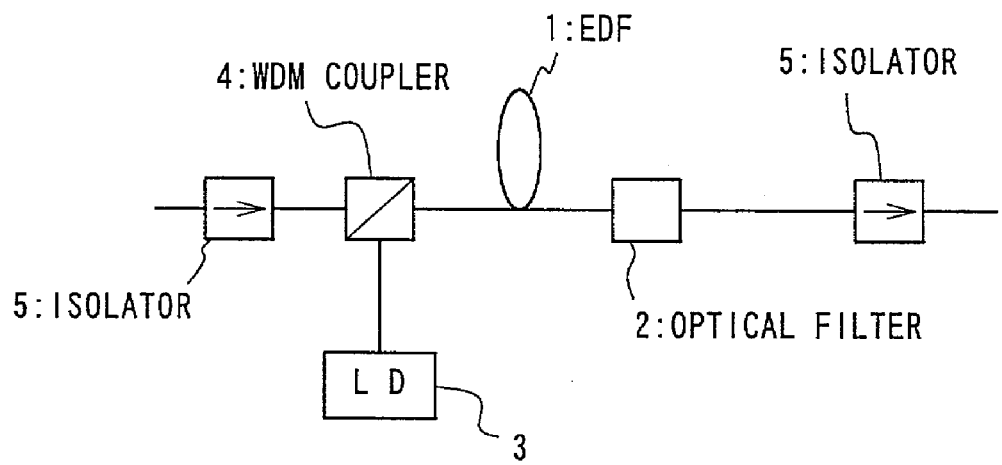
FIG. 5 is a schematic view of an example of an optical amplifier for comparison with an optical amplifier of the first embodiment.

As shown in FIG. 5, there may be provided only one single EDF 1, not multiple ones, and only one single optical filter 2 with such a transmission characteristic as shown by solid line B of FIG. 1. Such a type of EDFA 56C, however, will never be expected to reveal good amplification results.

Figure 6:
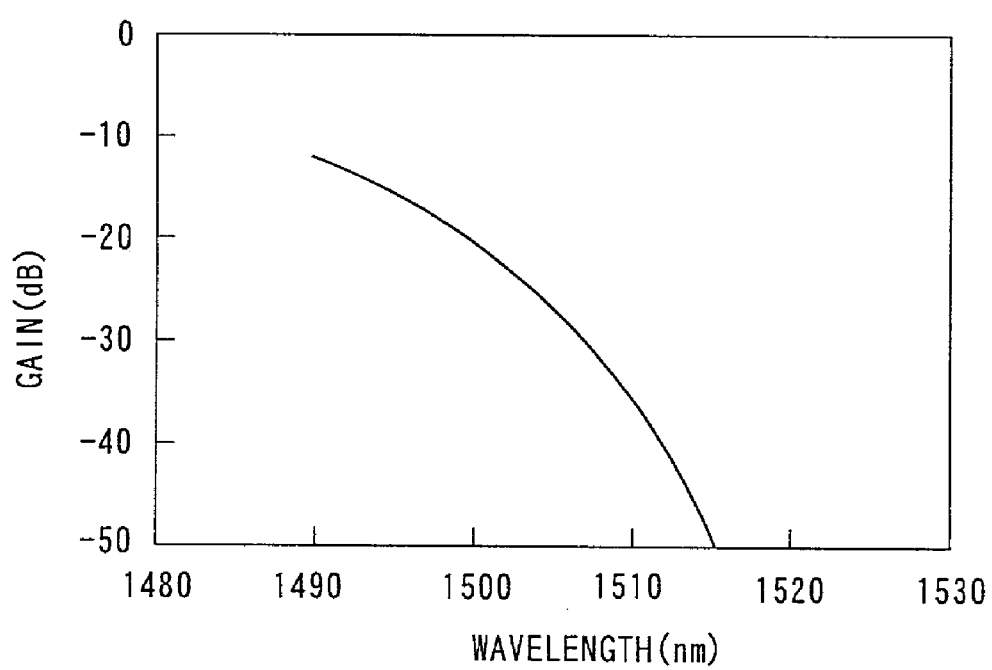
FIG. 6 is a plot of amplifier gain of the example of the optical amplifier of FIG. 5.

FIG. 6 shows an amplification result when using a single optical filter 2 with the transmission characteristic illustrated by solid line B of FIG. 1. As shown in FIG. 6, the gain takes negative values, indicating that no amplification is performed.

In view of these, multiple optical filters 2 are prepared in the present embodiment, and the sum of the transmission characteristics of the multiple optical filters 2 has the shape illustrated by solid line A of FIG. 1. Each of the multiple optical filters 2 is disposed between the individual EDFs 1.

Here, the sum of the transmission characteristics of the multiple optical filters 2 has the shape illustrated by solid line A of FIG. 1. The multiple optical filters 2, each of which is disposed between the individual multiple EDFs 1, have a common transmission characteristic.

With this construction, the amplification result of EDFA 56C has a flat shape across a range of wavelengths, as indicated by solid line A of FIG. 2. In addition, in comparison with the optical filters, 2-1 through 2-5, which have different transmission characteristics (see FIG. 38), as will be described later, manufacturing costs are reduced because of the use of the multiple optical filters 2 that have the same transmission characteristic.

In the present embodiment, the sum of the transmission characteristics of the multiple optical filters 2 has the shape illustrated by solid line A of FIG. 1, and each of the multiple optical filters 2, each of which is disposed between the individual multiple EDFs 1, have a common transmission characteristic. The present invention, however, should by no means be limited to this, the multiple optical filters 2 may have different transmission characteristics. At this time, every optical filter 2 may have a unique transmission characteristic of its own, or otherwise, some of the multiple optical filters 2 may have a common transmission characteristic.

Figure 36:
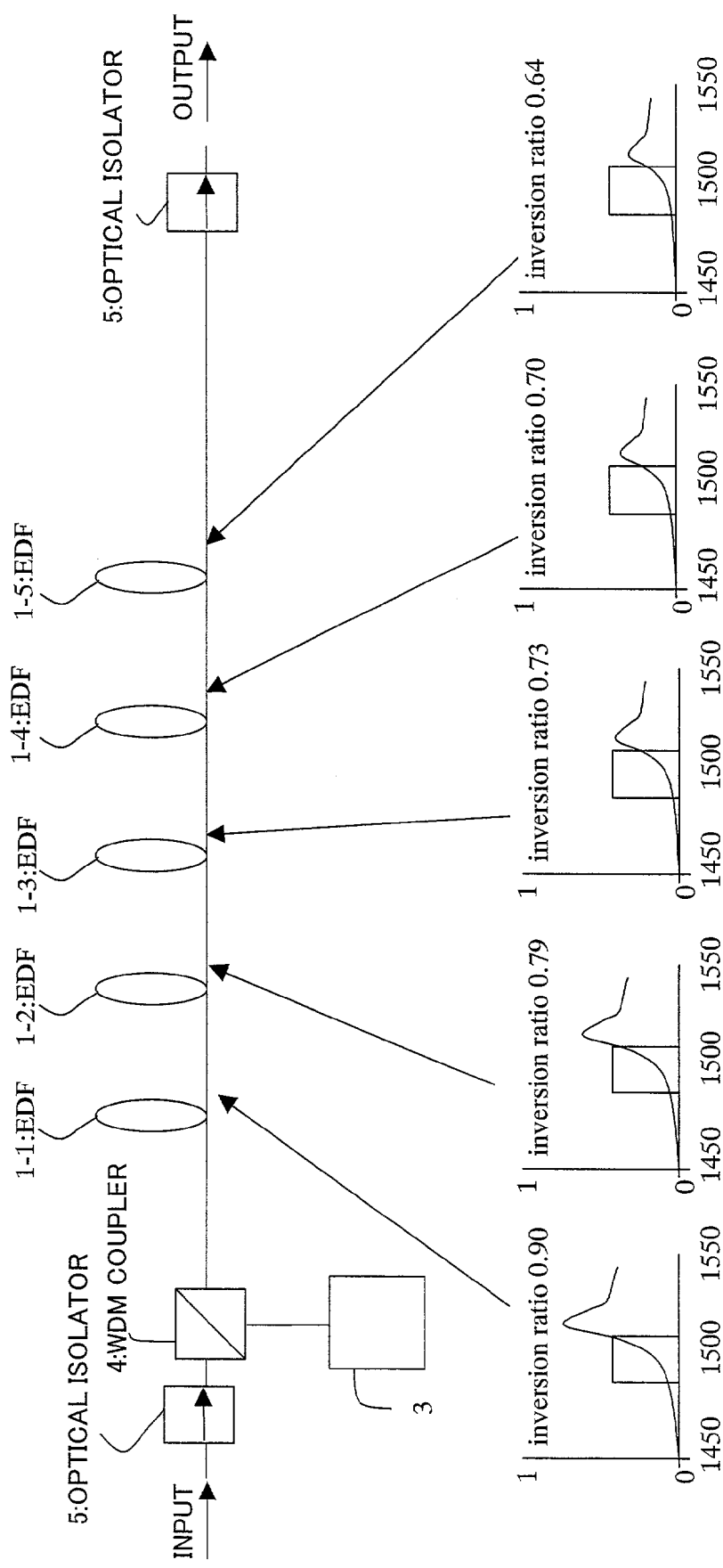
FIG. 36 is a view for describing of an inversion rate of each EDF in an optical amplifier of the first embodiment.

For example, a type of EDFA 56C in which pump beam emitter 3 is arranged prior to each EDF 1, the power of the emitted light (pump beam) from pump beam emitter 3 decreases gradually along the direction of the length of the fiber, and so, the inversion rate in each EDF 1 decreases with distance from pump beam emitter 3. With numerical examples, as shown in FIG. 36, the inversion rate per unit length of the first-stage EDF 1-1 is 0.90; that of the second-stage EDF 1-2, 0.79; that of the third-stage EDF 1-3, 0.73; that of the fourth-stage EDF 1-4, 0.70; and that of the fifth-stage EDF 1-5, 0.64. In this manner, the inversion rate of each EDF 1 decreases with distance from pump beam emitter 3.

Figure 37:
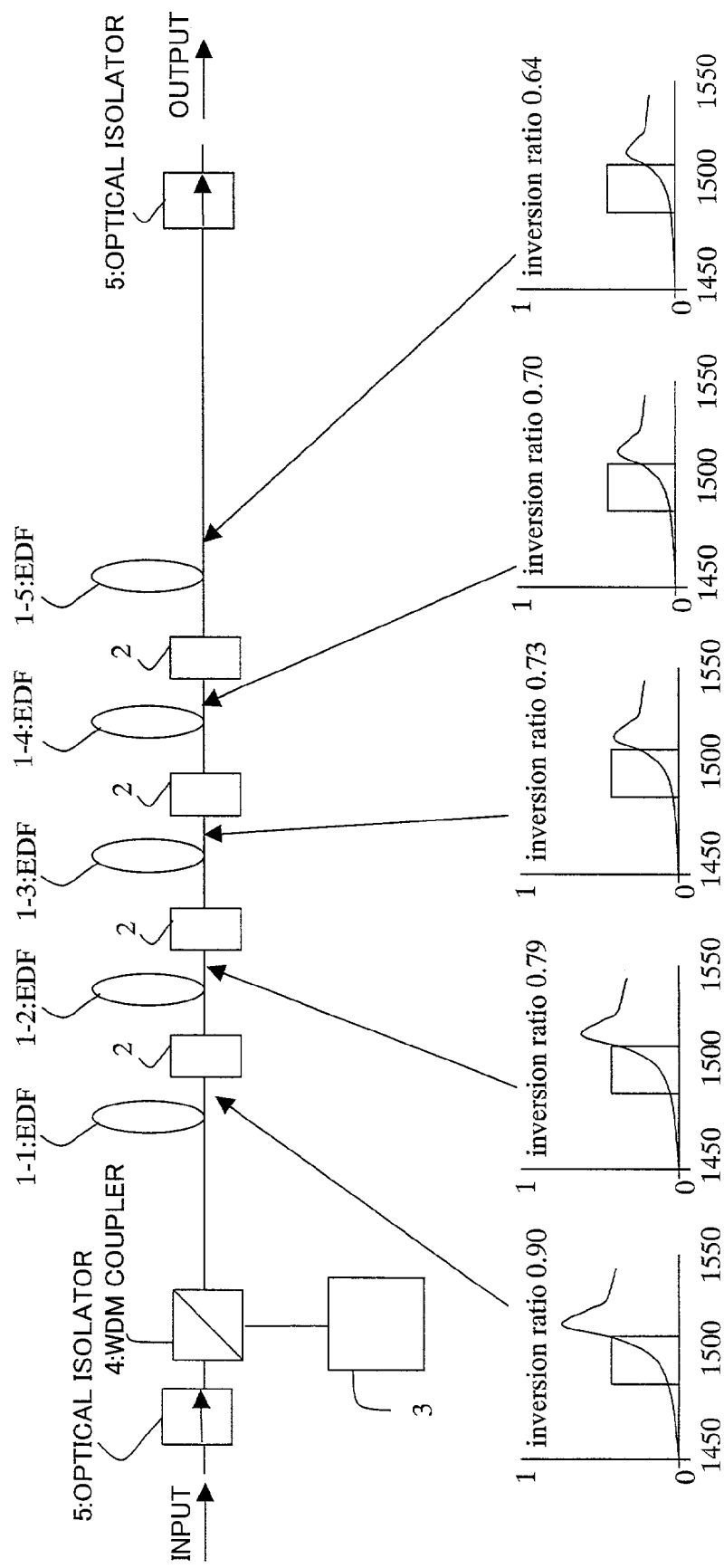
FIG. 37 is a view for describing problems which are caused if only optical filters with such a transmission characteristic that flattens a gain slope of the first-stage EDF are employed in an optical amplifier of the first embodiment.

Referring now to FIG. 37, all the multiple optical filters 2, each of which is interposed between the individual EDFs, 1-1 through 1-5, have such a transmission characteristic that flattens the slope of the gain of the first-stage EDF 1-1. In that case, since the inversion rates per unit length of the second- to fifth-stage EDFs, 1-2 through 1-5, are smaller than that (0.9) of the first-stage EDF 1-1, the longer the wavelength, the smaller, the gain (see solid line B of FIG. 2) in the band of 1490 to 1520 nm, so that the output gain varies across the range of wavelengths.

Figure 38:
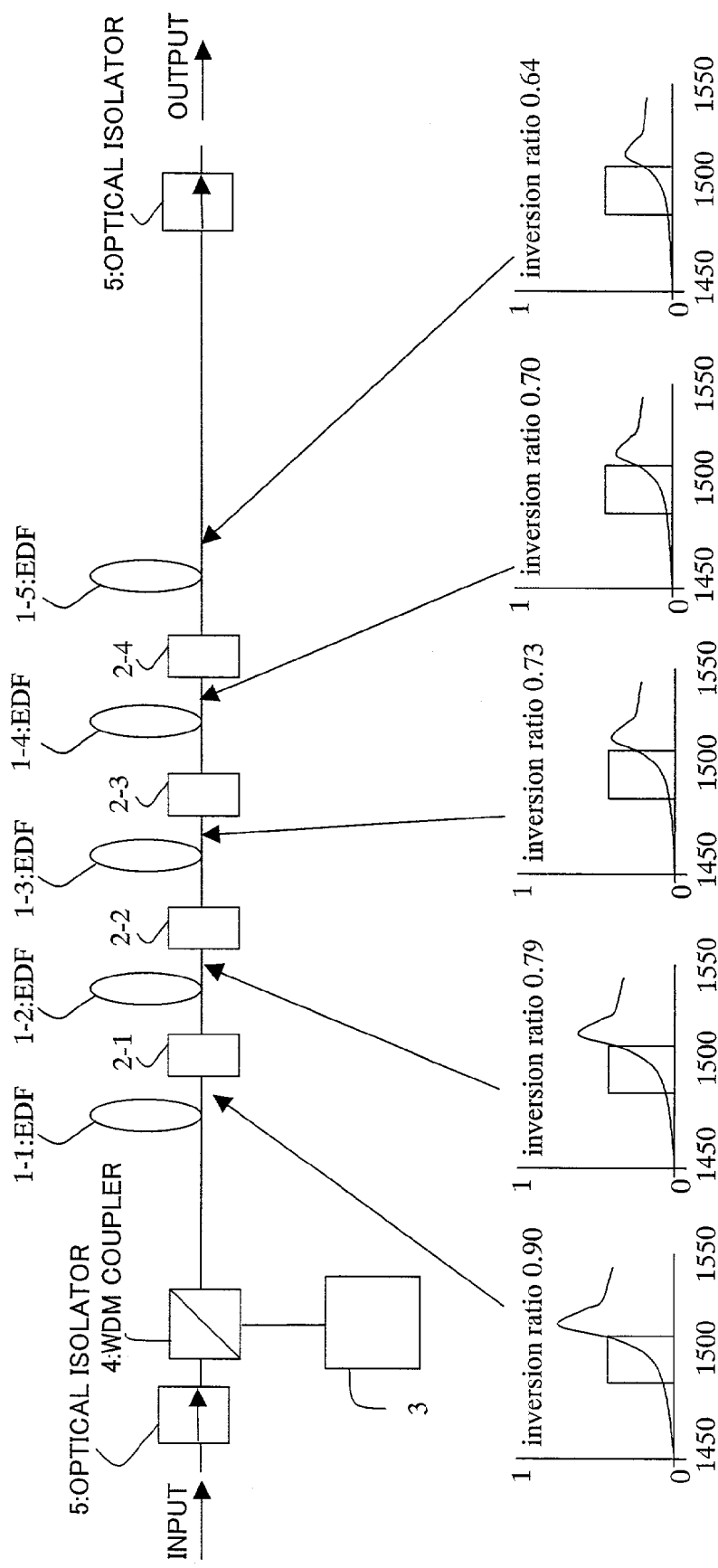
FIG. 38 is a view for describing a transmission characteristic of each optical filer in an optical amplifier of the first modification of the first embodiment.

Referring now to FIG. 38, the multiple optical filters, 2-1 through 2-4, each of which is interposed between the individual EDFs, 1-1 through 1-5, have such transmission characteristics (for example, inversions of the amplification characteristics of the EDFs) that flatten the slopes of the gains of the EDFs, 1-1 through 1-5, respectively. More specifically, optical filter 2-1 has a transmission characteristic which flattens the gain of the first-stage EDF 1-1; optical filter 2-2, that flattens the gain of the second-stage EDF 1-2; optical filter 2-3, that flattens the gain of the third-stage EDF 1-3; and optical filter 2-4, that flattens the gain of the fourth-stage EDF 1-4.

With this structure, it is possible to realize a flat gain slope at every stage of EDF all the time. It is thus possible to prevent the effect of a lowered inversion rate due to decreasing of the pump beam power along the direction of the length of the fiber, so that the amplification result of EDFA 56C reveals a flat shape across a range of wavelengths (see solid line A of FIG. 2).

Figure 39:
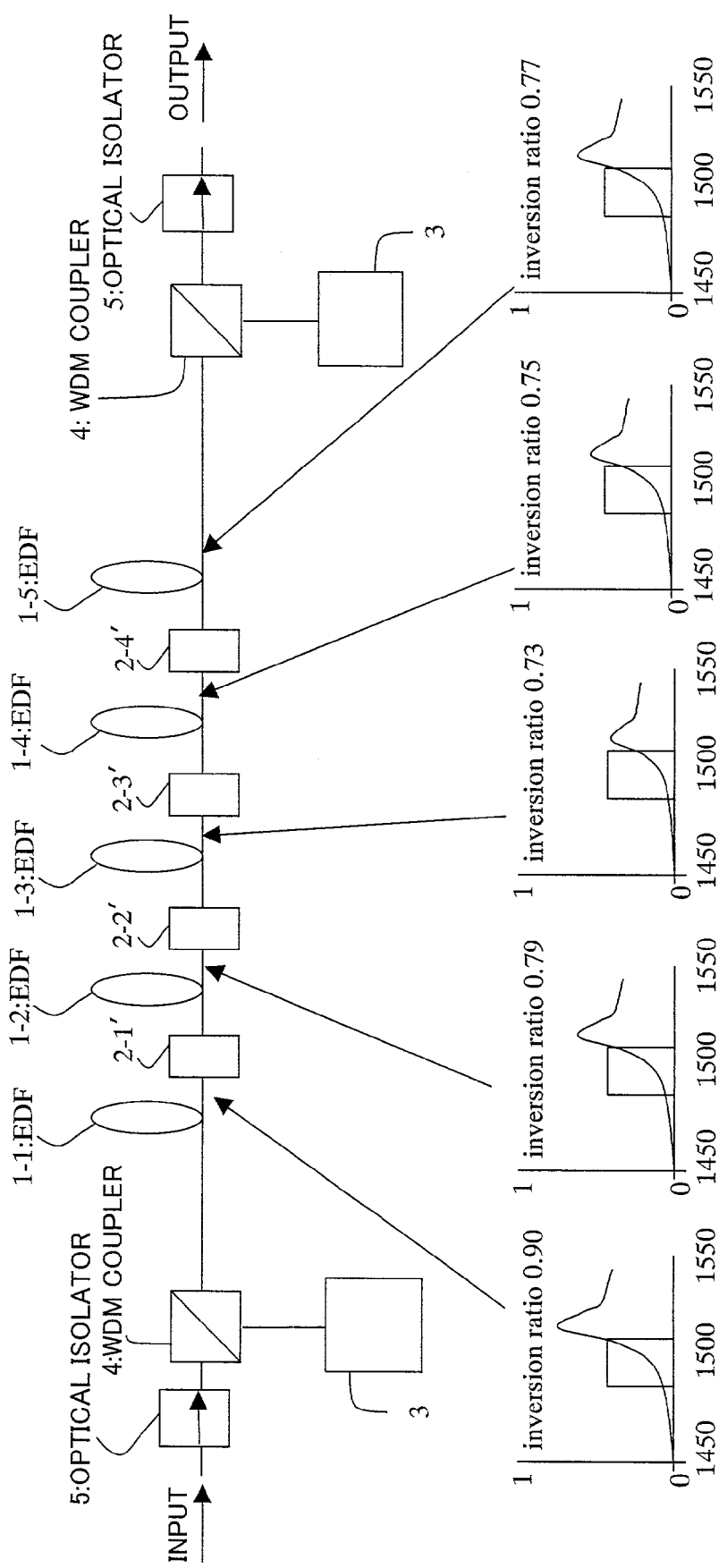
FIG. 39 is a view for describing a transmission characteristic of each optical filer employed in an optical amplifier of the second modification of the first embodiment.

Referring now to FIG. 39, a couple of pump beam emitters 3 are employed in the EDFA to realize a bidirectional stimulation. The inversion rate per unit length of the first-stage EDF 1-1 is 0.90; that of the second-stage EDF 1-2, 0.79; that of the third-stage EDF 1-3, 0.73; that of the fourth-stage EDF 1-4, 0.75; and that of the fifth-stage EDF 1-5, 0.77.

The sum of the transmission characteristics of the multiple optical filters 2 has the shape illustrated by solid line A of FIG. 1, and the multiple optical filters 2-1' through 2-4' (see FIG. 39), each of which is interposed between the individual EDFs, 1-1 through 1-5, have such transmission characteristics (for example, the inverted amplification characteristics of the EDFs) that flatten the slopes of the gains of the EDFs, 1-1 through 1-5, respectively. More specifically, optical filter 2-1' has a transmission characteristic which flattens the gain of the first-stage EDF 1-1; optical filter 2-2', that flattens the gain of the second-stage EDF 1-2; optical filter 2-3', that flattens the gain of the third-stage EDF 1-3; and optical filter 2-4', that flattens the gain of the fourth-stage EDF 1-4.

Here, concretely, each optical filter 2 is interposed between the individual EDFs (two to N stages of EDFs; four EDFs in the present embodiment) as shown in FIG. 11. Thus, there is provided no optical filter 2 after the last-stage EDF1. As a result, the number of optical filters 2 is smaller by one than the number of EDFs 1. With such construction, with no optical filter 2 after the last-stage EDF1, the efficiency of S-band optical amplifier 56C can be improved though its NF (NF characteristic) is rather inferior. In the foregoing two-stage amplifier structure, in which the first- (fore-) and the second-(rear-)stage S-band optical amplifiers 56C are provided, the second-stage amplifier structure is required to have higher efficiency than that of the first-stage amplifier structure. The above construction is thus suitable for use in the second-stage S-band optical amplifier 56Cb.

Figure 20:
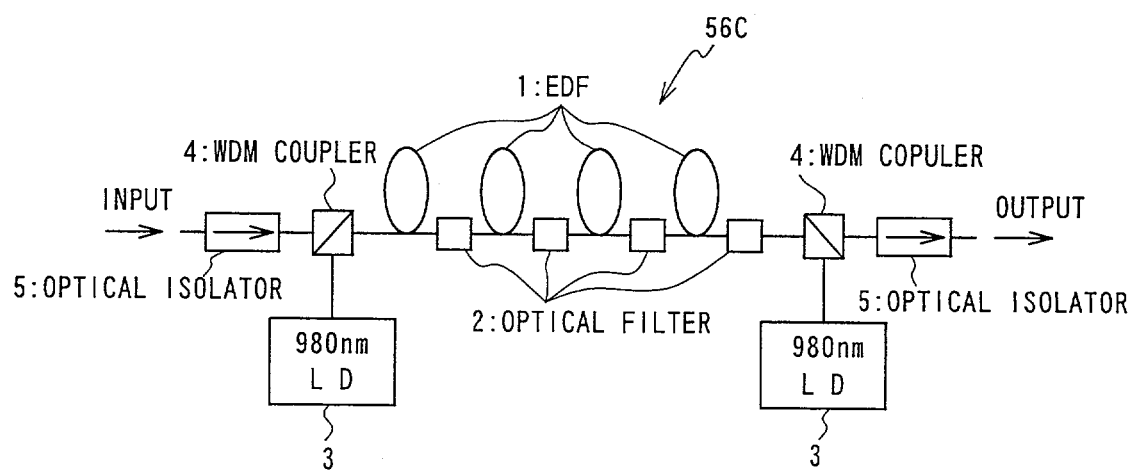
FIG. 20 is a schematic view of a first modified example of an optical amplifier of the first embodiment.

As shown in FIG. 20, there may be provided another optical filter 2 after the last-stage EDF 1, that is, equal numbers of optical filters 2 and EDFs 1 are provided. With this construction, the NF of S-band optical amplifier 56C is improved though the efficiency of S-band optical amplifier 56C is rather low. In this case, the optical filter 2 provided after the last-stage EDF 1 serves to improve the NF of S-band optical amplifier 56C. In the foregoing two-stage amplifier structure, in which the first- and the second-stage S-band optical amplifiers 56C are provided, the first-stage amplifier structure is required to have higher efficiency than that of the second-stage amplifier structure. The above construction is thus suitable for use in the first-stage S-band optical amplifier 56Cf.

Figure 21:
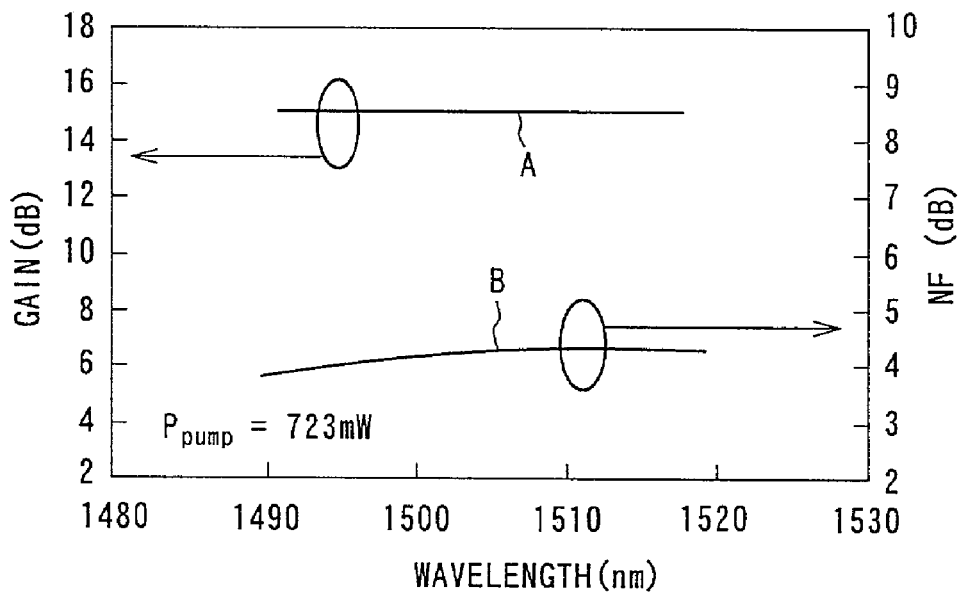
FIG. 21 is a plot for describing gain and NF of an optical amplifier according to the first modification of the first embodiment.
Figure 22:
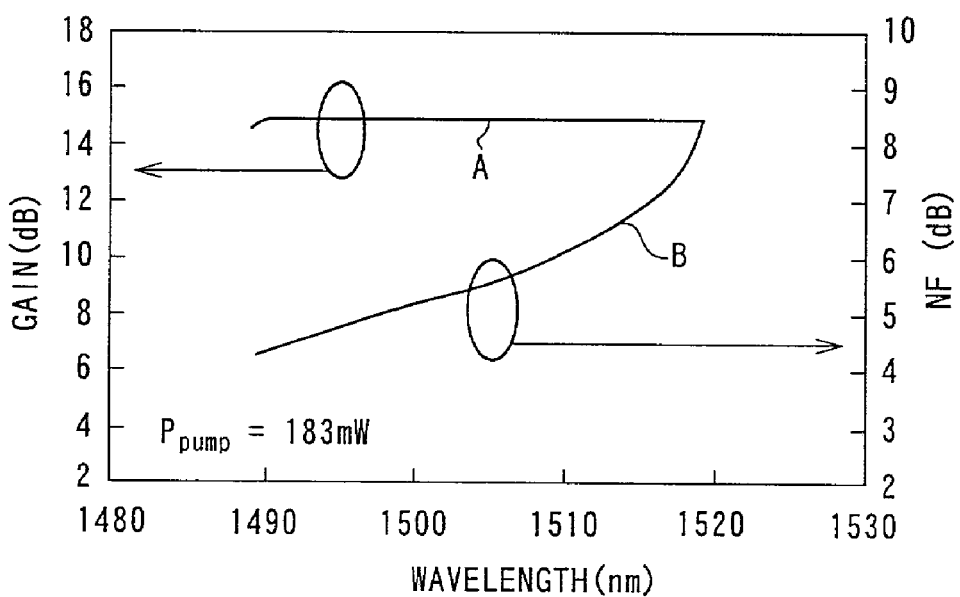
FIG. 22 is a plot for describing gain and NF of an optical amplifier according to the first embodiment.

Here, FIG. 21 shows the gain and the NF of an S-band optical amplifier 56C in which an optical filter 2 is disposed subsequently to the last-stage EDF 1, and FIG. 22 shows the gain and the NF of another S-band optical amplifier 56C with no such optical filter 2. In FIG. 21 and FIG. 22, solid line A represents the gain, and solid line B represents the NF.

Comparison of these two cases brings about the following evaluation. With an optical filter 2 after the last-stage EDF 1, as shown in FIG. 21, the pump beam power $P_{PUMP}$ required to obtain a 15-dB gain is 723 mW, whereas with no optical filter 2 after the last-stage EDF 1, as shown in FIG. 22, the pump beam power $P_{PUMP}$ required to obtain the same amount of gain is no more than 183 mW. This indicates that higher amplification efficiency is realized where no optical filter 2 is disposed after the last-stage EDF 1 than where the one is disposed, because the same gain is attained with lower pump beam power in the former case.

On the other hand, with an optical filter 2 after the last-stage EDF 1, as shown in FIG. 21, the NF is approximately uniform across a range of wavelengths, and its maximal value is about 4 dB, whereas with no optical filter 2, as shown in FIG. 22, the longer the wavelength, the greater the NF; the maximal value of the NF is increased to about 8 dB. This indicates that with an optical filter 2 after the last-stage EDF 1, the NF is significantly restrained to a low value, that is, the NF characteristic is improved.

Figure 23:
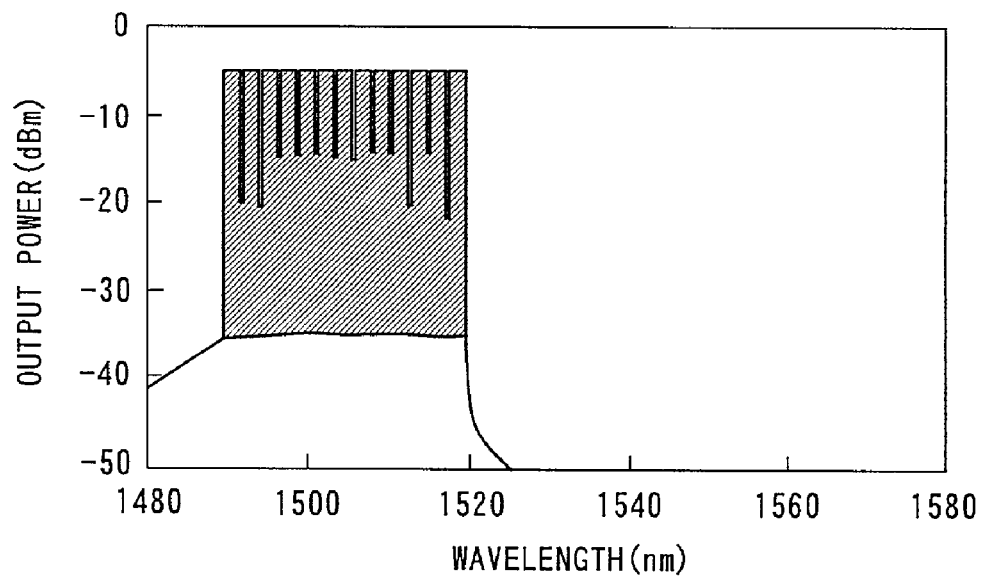
FIG. 23 is a plot of amplified optical signals in the S-band by an optical amplifier of the first modification of the first embodiment.
Figure 24:
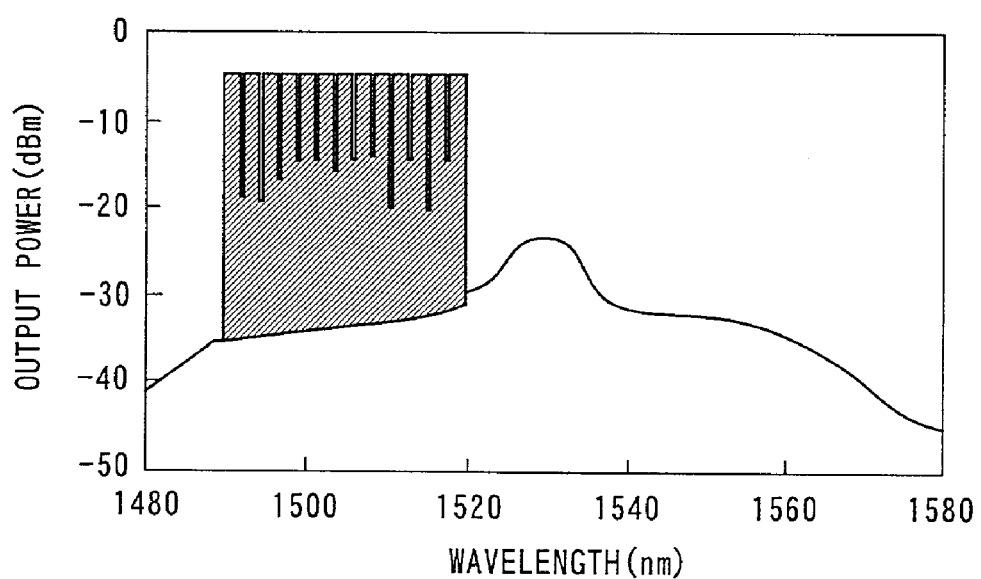
FIG. 24 is a plot of amplified optical signals in the S-band which are amplified by an optical amplifier of the first embodiment.

In addition, FIG. 23 shows the result (i.e., an output spectrum) of amplification of the S-band optical signals in a case where an optical filter 2 is employed after the last-stage EDF, and FIG. 24 shows the same in a case where no such optical filter 2 is employed.

Referring now to these spectra, as shown in FIG. 23, with an optical filter 2 after the last-stage EDF 1, ASE in the C-band gives no effect on the output power, because the last-stage optical filter 2 blocks the C-band ASE. Whereas, with no optical filter 2, the output power is affected by the C-band ASE, as shown in FIG. 24.

In the present embodiment, the transmission characteristics of the optical filters are set based upon the wavelength gain characteristics of EDFs at an inversion rate of 0.9, so as to make the S-band optical amplifier operate at an inversion rate of 0.9. The present invention, however, should by no means be limited to this. For example, any desirable inversion rate can be selected in such a manner that the gain can be obtained in the optical signal band to be used. On the basis of this selected inversion rate, the transmission characteristics of the optical filters are determined, and the S-band optical amplifier is put into operation. Inversion rates of, e.g., from 0.7 to 1.0 can be employed. In particular, when an optical amplifier for amplifying optical signals in the $S^+$-band, from 1450 to 1490 nm, is provided, the inversion rate can take values of 0.8 to 1.0. In this case, since the output gain depends upon the bands, the length of an EDF is required to be adjusted in such a way that desired gain could be attained.

Pump beam emitter 3 is realized by a pump beam emitter that emits a 980 nm-band pump beam. For example, a laser diode (LD, semiconductor laser) can be used that outputs a laser beam in the 980-nm band. This is because the use of a pump beam in the 980-nm band (the emission wavelength is 980 nm) increases the inversion rate of EDF 1.

At that time, to amplify optical signals in the S-band, EDF 1 is required to operate at a high inversion rate (e.g., 0.7 to 1.0). Automatic gain control circuit 64 of the present embodiment thus controls the power of a pump beam in such a way that the inversion rate of EDF 1 takes a value of 0.9.

Pump beam emitter 3 is not necessarily required to be a single unit of a semiconductor laser, and multiple laser beams (pump beams) emitted from more than one semiconductor laser can be wavelength-division multiplexed and/or polarization combined.

Here, in the optical amplifier of FIG. 11, pump beams are supplied bidirectionally, so that the inversion rate of EDFs 1 is uniformly high along the direction of the length of EDFs 1. Thus in FIG. 11, to serve as pump beam emitter 3 and WDM coupler 4, a first pump light emitter 3f and a first WDM coupler 4f are provided prior to a chain of EDFs 1, and a first pump light emitter 3b and a first WDM coupler 4b are provided subsequently to the chain of EDFs 1.

The example illustrates a bidirectional emission type of optical amplifier, in which pump beams are supplied from both the input and the output ends of the chain of EDFs 1. The present invention should by no means be limited to this, and for example, other types of amplifiers may also be used, such as a front emission-type one, in which the pump beam for exciting EDFs 1 is supplied from the input end of the amplifier chain, and a rear emission-type one, in which the pump beam for exciting EDFs 1 is supplied from the output end of the amplifier chain.

Figure 25:
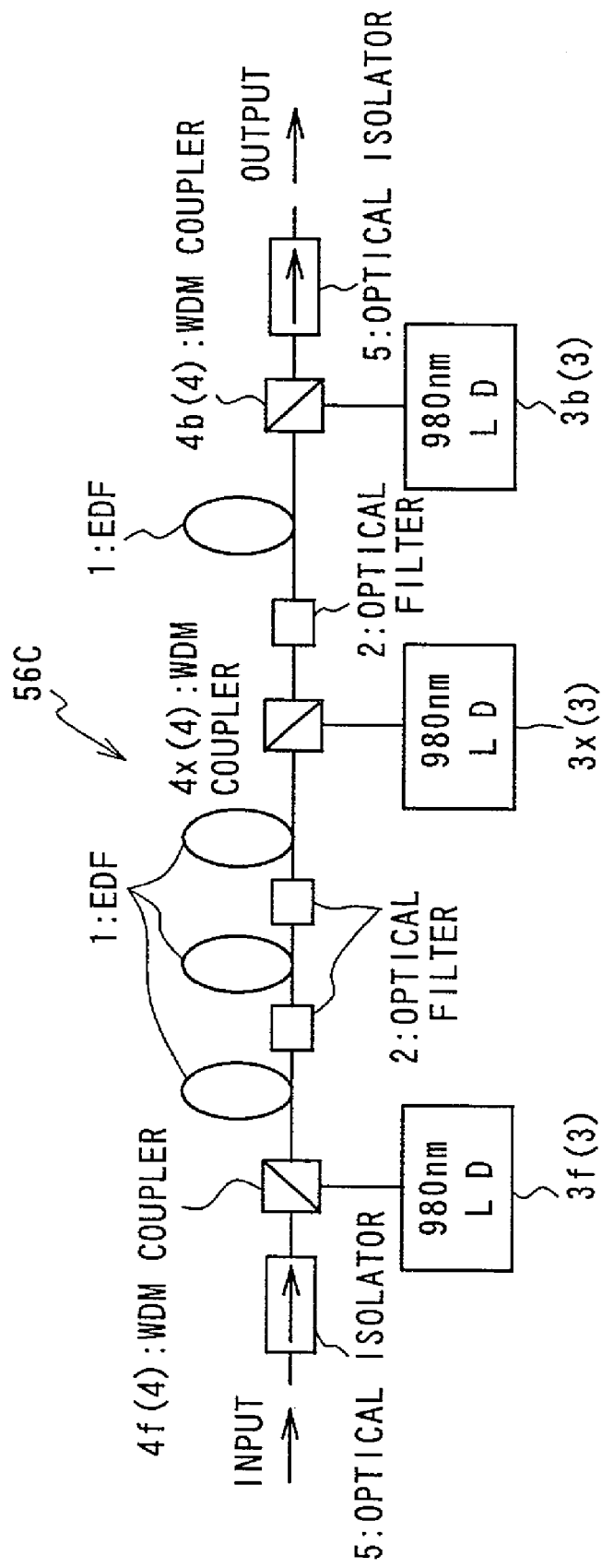
FIG. 25 is a schematic view of a second modified example of an optical amplifier of the first embodiment.

Further, as shown in FIG. 25, WDM coupler 4x (4) is inserted into the chain of multiple EDFs 1, and via this WDM coupler 4x, a pump beam (for example a 980-nm laser beam) is supplied from pump beam emitter 3x (3). With this structure, the inversion rate in the middle (in the longitudinal direction) of S-band optical amplifier 56C takes a high value, thereby improving the efficiency and the NF characteristic of S-band optical amplifier 56C.

S-band optical amplifier 56C of the present embodiment with the above-described structure, amplifies input optical signals in the following manner to output the resulting amplified optical signals.

First of all, a pump beam (for example, a laser beam at, e.g., 980 nm) emitted from pump beam emitter 3 is input from the input end via WDM coupler 4 to excite EDFs 1 so as to make them operate at a high inversion rate (of e.g., 0.9 in this description). Wavelength-division multiplexed optical signals (WDM optical signals) are then input to the excited EDFs 1 via optical isolator 5 and WDM coupler 4 to be amplified by using the stimulated emission effect in the EDFs 1. The amplified optical signals are then output from the output end via another optical isolator 5.

At that time, the above-described structure of the present embodiment realizes S-band optical amplifier 56C, but if any manufacture error occurs in optical filter 2, gain tilts are caused across the available wavelengths.

Figure 26:
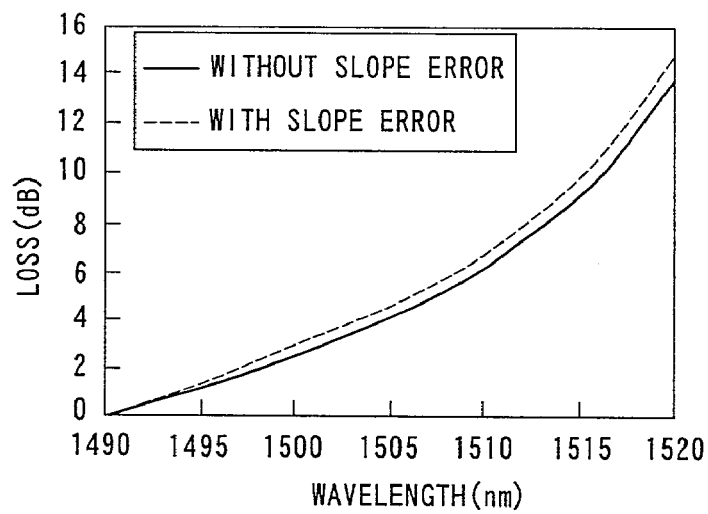
FIG. 26 is a plot for describing a manufacture error of an optical filter in an optical amplifier of the first embodiment.

For example, as shown in FIG. 26, with a slope error such as a manufacture error of optical filter 2, the loss is increased in comparison with the case with no slope error, thereby causing tilts in gain.

Accordingly, it is preferable that a function for compensating for the gain tilts caused by a manufacture error of optical filter 2 is guaranteed.

The following are exemplary methods for compensating for the gain tilts: (1) to adjust the length of one or more of the EDFs; (2) to adjust the temperature of one or more of the EDFs; (3) to adjust the pressure applied on one or more of the EDFs; and (4) to provide a Raman amplifier. These methods can be used alone or in arbitrary combination.

Figure 27:
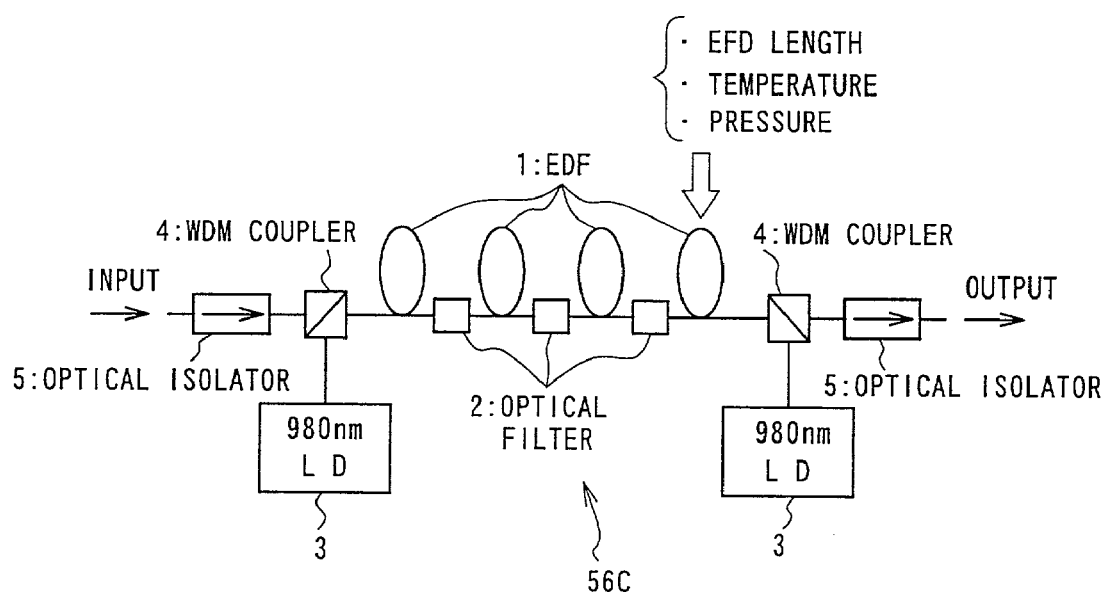
FIG. 27 is a schematic view for describing compensation for gain tilts caused by the manufacture error of the optical filter.

In foregoing methods (1) through (3), any one of the multiple EDFs 1 is adjusted in length, temperature, or pressure to be applied thereon. It is thoroughly preferable if the EDF 1 that undergoes such adjustment is the last-stage EDF 1 as shown in FIG. 27. This is because the gain tilts due to a manufacture error of optical filter 2 cannot be recognized until S-band optical amplifier 56C is assembled. The last-stage EDF 1 is easy to adjust in length, temperature, or pressure to be applied thereon, even after the completion of assembly. Likewise, from the standpoint of easiness in adjusting its length, temperature, or pressure to be applied, the fist-stage one is also preferable.

Figure 28:
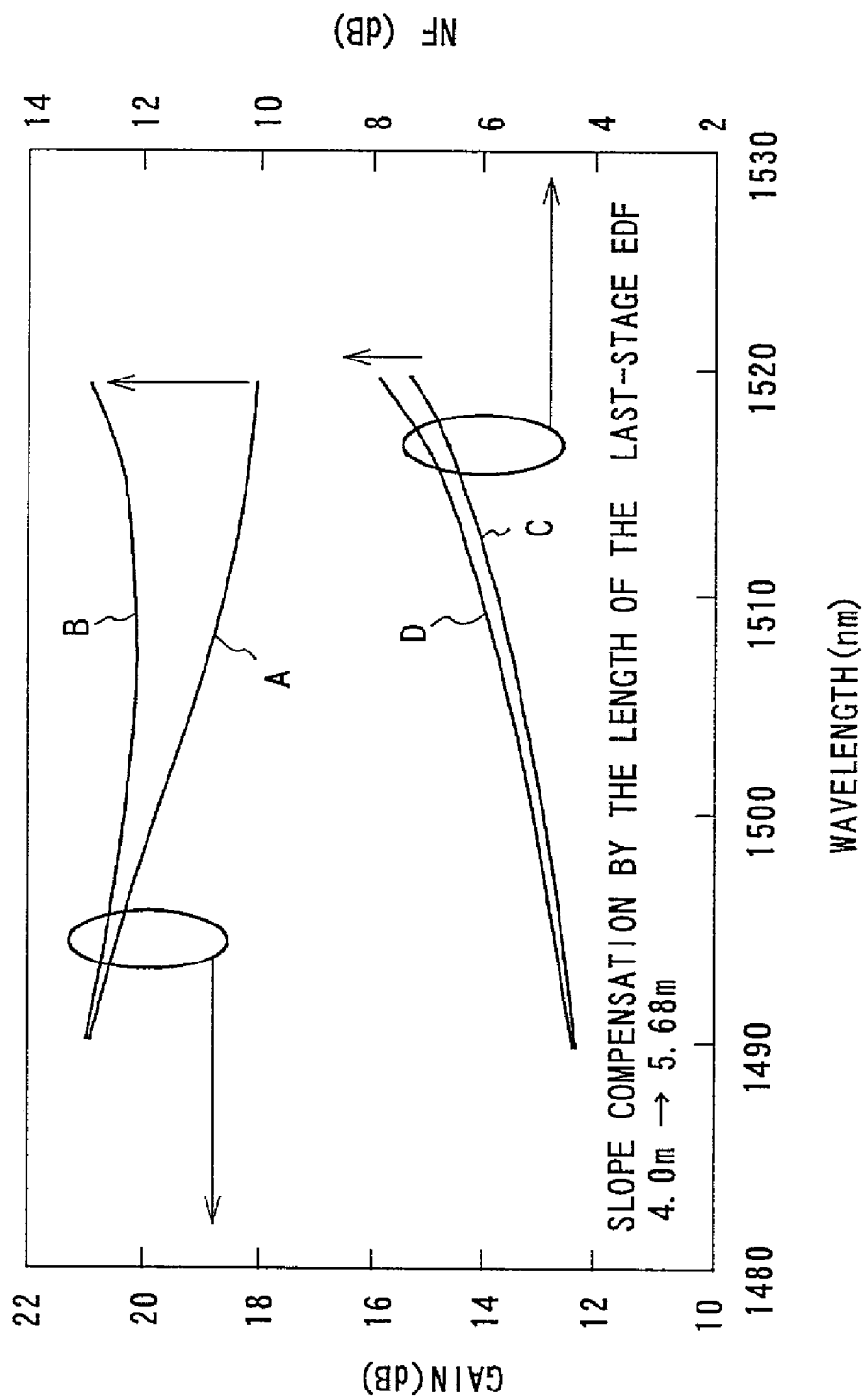
FIG. 28 is a plot for use in description of the result of the compensation of FIG. 27.

For example, as represented by solid line A in FIG. 28, if gain tilts are caused across a range of wavelengths, the length of the last-stage EDF should be increased from 4 m to 5.68 m. As a result, the gain has a flat shape as represented by solid line B of FIG. 28, and thereby the gain tilts are compensated for (tilt compensation is realized).

After the length of an EDF is increased to flatten the gain so as to compensate for the gain tilts, the shape of the NF characteristic represented by solid line C in FIG. 28 is changed into that represented by solid line D in FIG. 28, revealing a slight, but insignificant, increase in NF value.

Figure 29:
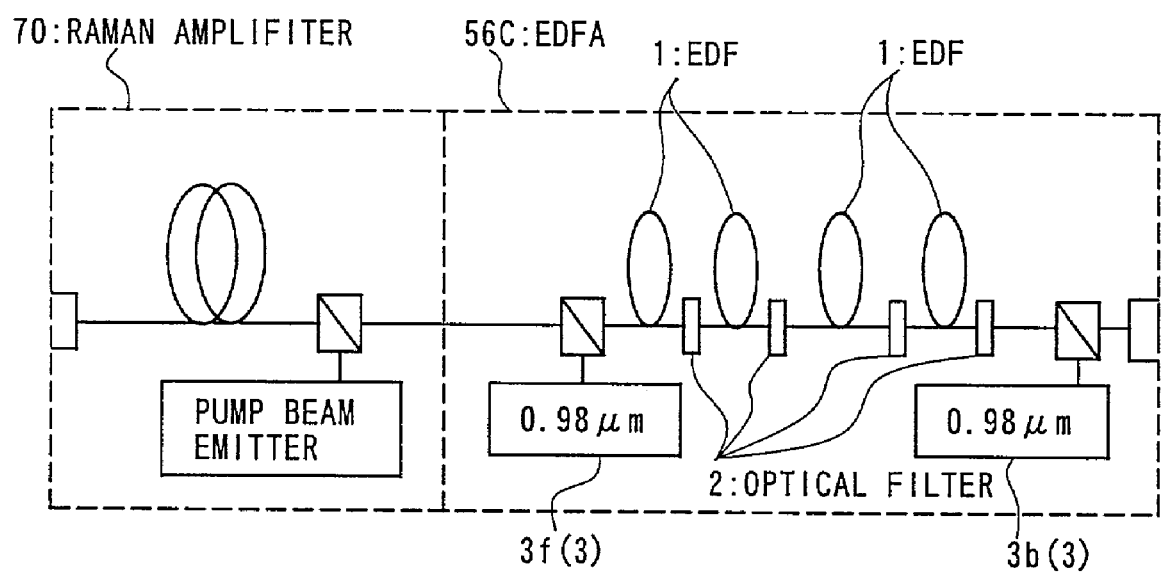
FIG. 29 is a schematic view for describing compensation for gain tilts caused by the manufacture error of the optical filter.

In method (4), as shown in FIG. 29, Raman amplifier 70 is disposed prior to EDFA 56C, thereby realizing a hybrid optical amplifier that combines Raman amplifier 70 with EDFA 56C including multiple EDFs.

Figure 30:
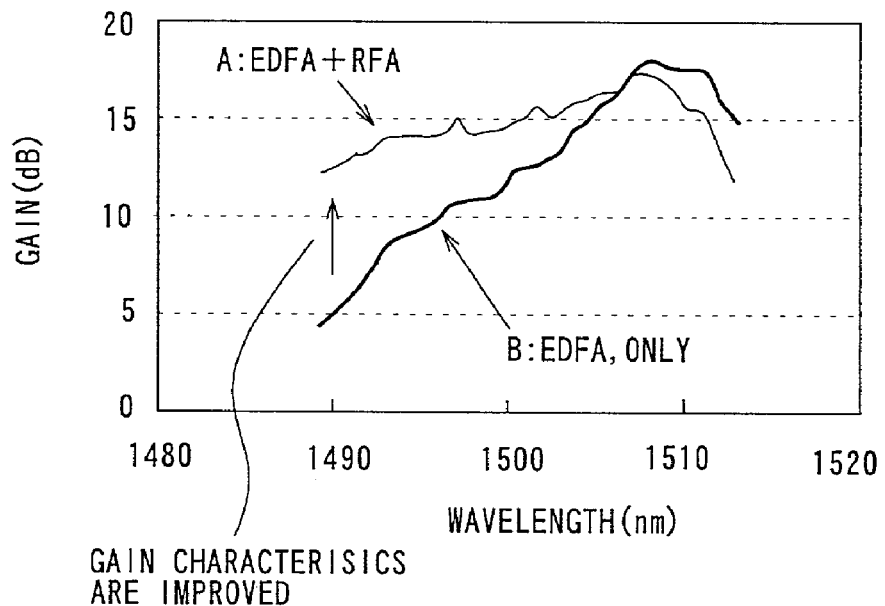
FIG. 30 is a plot for describing the result of the compensation of FIG. 29.
Figure 31:
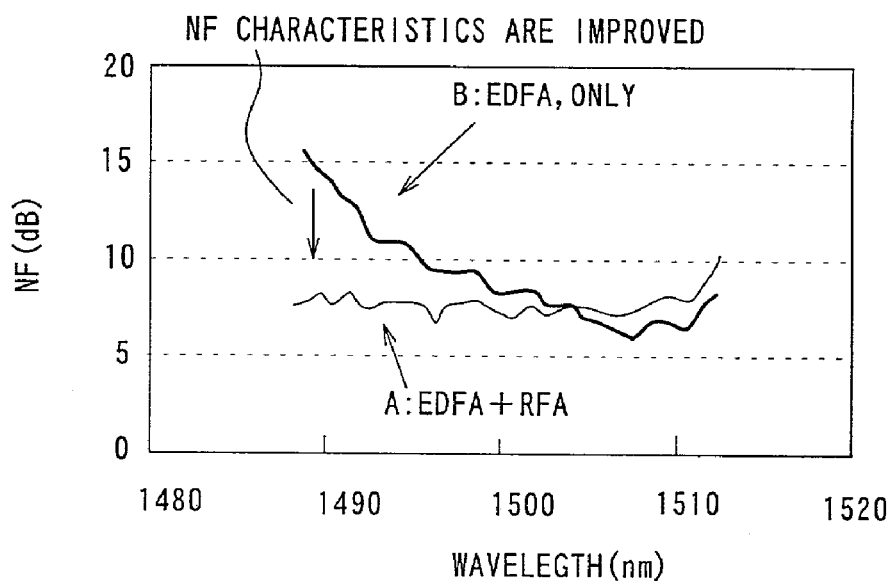

With such a structure, it is possible to compensate for gain tilts that would occur with EDFA 56C alone with no use of Raman amplifier 70, so that the characteristic of the amplifier gain is improved. Precisely, with EDFA 56C alone, the gain, represented by thick line B in FIG. 30, is lower at shorter wavelengths than that at longer wavelengths, thus exhibiting gain tilt. With Raman amplifier 70 provided prior to EDFA 56C, it is possible to make up for such lower gain at shorter wavelengths as represented by fine line A in FIG. 30, so that the gain tilt is offset (the gain characteristic is flattened), thereby improving the gain characteristic.

Further, with the hybrid amplifier, it is possible to improve the NF characteristic in comparison with a case where EDFA 56C alone is employed. The NF, represented by thick line B in FIG. 31, takes higher values at shorter wavelengths than those at longer wavelengths. With Raman amplifier 70 provided prior to EDFA 56C, it is possible to lower the NF values at shorter wavelengths (the NF characteristic is flattened) as shown by fine line A in FIG. 31, so that the NF characteristic is improved.

Accordingly, an optical amplifier of the present embodiment carries an advantage of realizing EDFA 56C that has new amplification bands, i.e., the S-band and the S$^+$-band.

Further, the gain tilt compensation methods of the present embodiment are advantageous in that they reliably compensate for gain tilts, if any, caused by a manufacturing error of optical filter 2 or the like.

Note that the description was made of S-band optical amplifier 56C in the first embodiment, and the similar technological principle can be utilized to prepare an S$^+$-band optical amplifier for amplifying optical signals at wavelengths in the S$^+$-band, from 1450 to 1490 nm. Moreover, it is also possible to combine S-band optical amplifier 56C with an S$^+$-band optical amplifier into an S-band optical amplifier for amplifying multiple optical signals at wavelengths of 1450 to 1530 nm.

Note that, in the above description of the first embodiment, the C-band, L-band, L$^+$-band, S-band, and S$^+$-band are defined to have respective ranges of wavelengths, but the ranges should not be strictly limited to those values.

[2] Second Embodiment

Referring now to FIG. 32 through FIG. 35, a description will be made hereinbelow of an optical amplifier and a method for compensating for gain tilts of the optical amplifier according to a second embodiment of the present invention.

The difference between an optical amplifier of the second embodiment and that of the first embodiment lies in the structure of L-band optical amplifier 56B. More specifically, a common type of EDFA commercially available serves as L-band optical amplifier 56B of the first embodiment, whereas in the second embodiment, L-band optical amplifier 56B has a structure similar to that of the above-described S-band optical amplifier 56C, so that the characteristics of optical filters 2 are optimized in a similar manner to that in S-band optical amplifier 56C.

Concretely, L-band optical amplifier 56B of the present embodiment is an erbium-doped fiber amplifier (EDFA). As in the case of S-band optical amplifier 56C (see FIG. 11), L-band optical amplifier 56B has multiple (four 4-m fibers in the example) erbium-doped fibers (EDFs, rare-earth element doped fibers) 1, multiple optical filters 2 each interposed between the individual EDFs 1, pump beam emitters 3 each for supplying a pump beam (for example, a laser beam at 980 nm) to EDFs 1, and wavelength-division multiplexing couplers (WDM couplers) 4 for introducing the pump beams into EDFs 1. In addition, optical isolators 5 are provided both on the optical signal input side (prior to the set of EDFs) and on the optical signal output side (posterior to the set of EDFs) to remove light reflected from the optical components.

L-band optical amplifier 56B amplifies input optical signals in the following manner to output the resulting amplified optical signals.

First of all, a pump beam (for example, a laser beam at, e.g., 980 nm) emitted from pump beam emitter 3 is input from the input end via WDM coupler 4 to excite EDFs 1 in such a way that EDFs 1 operate at a high inversion rate (of e.g., 0.9 in this description). Wavelength-division multiplexed optical signals (WDM optical signals) are then input to the excited EDFs 1 via optical isolator 5 and WDM coupler 4 to be amplified with the effect of stimulated emission of EDFs 1. The amplified optical signals are then output from the output terminal via another optical isolator 5.

Other specifics, except what should be applied only to the S-band, are similar to those of S-band optical amplifier 56C. L-band optical amplifier 56B has the following features.

Optical filters 2 of L-band optical amplifier 56B have the following characteristics (1) through (3).

(1) optical filters 2 transmit a pump beam in the 980-nm band, a range of wavelengths from 970 to 990 nm. This is because the pump beam at a wavelength of 980 nm guarantees a high inversion rate which is required to amplify the L-band optical signals.

(2) optical filters 2 block ASE at wavelengths of 1570 nm or shorter (particularly in the C-band). Note that "to block" means here that the absorption (loss) of the ASE amounts to 25 dB or greater. This characteristic is given for the purpose of improving the amplification efficiency in the L-band.

As shown in FIG. 10, EDF 1 has such gain that peaks at a wavelength of around 1530 nm. Accordingly, the loss at around 1530 nm due to optical filter 2 takes an important role in sufficiently suppressing the ASE. Here, with increase in operation gain of EDF 1 or increase in the length of a single EDF 1, the ASE power to be generated is increased, and the required loss at around 1530 nm is also increased, in view of these, the loss at around 1530 nm due to optical filter 2 should be determined in accordance with the operation gain of EDF 1 and the length of a single EDF. For example, in L-band optical amplifier 56B with five 4-m EDFs operating at a gain of 15 dB, a required loss at around 1530 nm amounts to 25 dB.

(3) Optical filter 2 equalizes the optical signal gain across the L-band, a range of wavelengths from 1570 to 1600 nm. Optical filter 2 might be regarded as a gain equalizer (GEQ) because it has such a gain-equalizing characteristic. This characteristic is given for flattening the wavelength gain characteristic across the L-band to reduce the optical signal gain tilts across the L-band.

Figure 32:
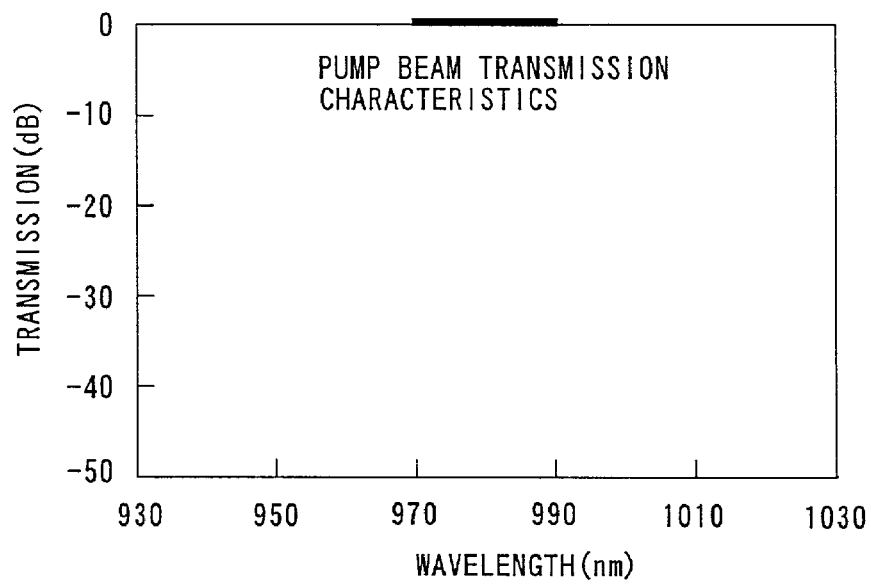
FIG. 32 is a plot of a transmission characteristic of each optical filter in an optical amplifier of a second embodiment, at a wavelength range from 930 to 1030 nm.
Figure 33:
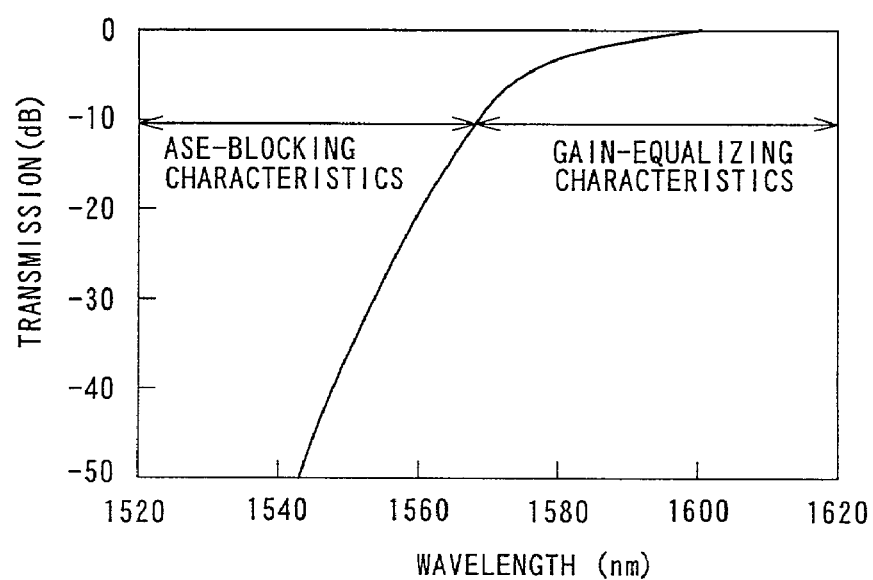
FIG. 33 is a plot of a transmission characteristic of each optical filter employed in an optical amplifier of the second embodiment, at a wavelength range from 1520 to 1620 nm.

At that time, optical filter 2 given the foregoing characteristics (1) through (3) has the following wavelength-dependant characteristic of transmission rate: the transmission rate maintains a value of approximately 0 dB across the 980-nm band, as shown in FIG. 32 and FIG. 33, so as to allow a 980-nm pump beam to pass thorough optical filter 2; and the shorter the wavelength, the smaller the transmission rate becomes, across the band ranging from about 1540 nm to about 1600 nm, gradually from a transmission rate of 0 dB (increase in negative value).

In the present embodiment, the transmission characteristics of optical filters 2 are set based upon the wavelength gain characteristics of EDFs 1 at an inversion rate of 0.9, so as to make the L-band optical amplifier 56B operate at an inversion rate of 0.9. The present invention, however, should by no means be limited to this. For example, any desirable inversion rate can be selected in such a manner that the amplifier gain can be obtained in the optical signal band to be used. On the basis of this selected inversion rate, the transmission characteristics of optical filters 2 are determined, and the L-band optical amplifier 56B is put into operation. Inversion rates of, e.g., from 0.4 to 1.0 can be employed. At that time, since output gain depends upon the bands, the length of an EDF 1 is required to be adjusted in such a way that desired gain could be attained.

Although amplification of optical signals in the L-band normally requires a total length of the EDFs of 50 m or so, L-band optical amplifier 56B of the present embodiment requires a shorter length of EDFs (four 4-m EDFs, totaling 16 m).

Figure 34:
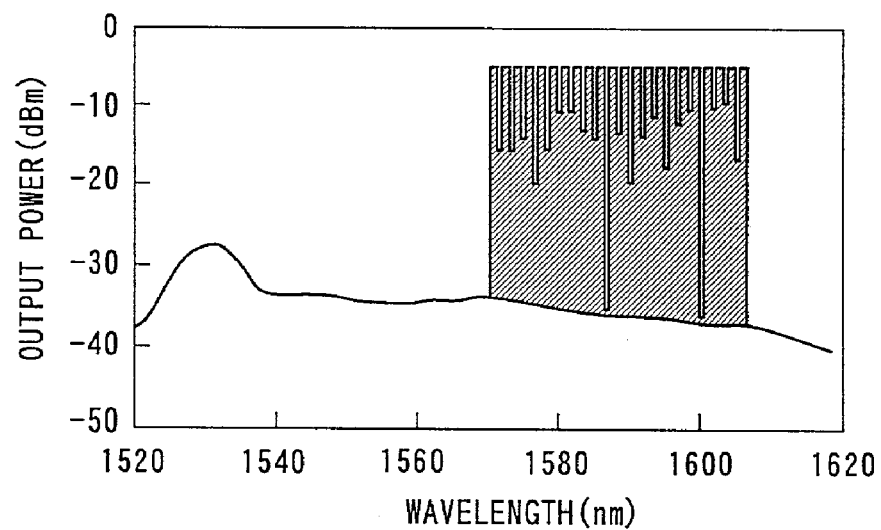
FIG. 34 is a plot of amplified optical signals in the L-band which are amplified by an optical amplifier of the second embodiment.

FIG. 34 shows the result (i.e., an output spectrum) of amplification of optical signals in the L-band, which amplification is carried out by L-band optical amplifier 56B having four 4-m EDFs 1.

Even with a far shorter length (16 m) of the EDFs of the present embodiment than that (50 m) of EDFs having been normally used, the L-band EDFA 56B of the present embodiment can still exhibit reliable amplification results.

This excellent feature of the present embodiment will eliminate various problems caused by excessively long EDFs.

For example, the long EDFs cause some interaction between optical signals at different wavelengths. The output power of an optical signal at the longer wavelength varies depending on the existence of an optical signal at the shorter wavelength. It might be impossible for a receiver to receive an optical signal if its output power is significantly low. The EDFs of the present invention whose lengths are significantly reduced will solve this problem.

Figure 35:
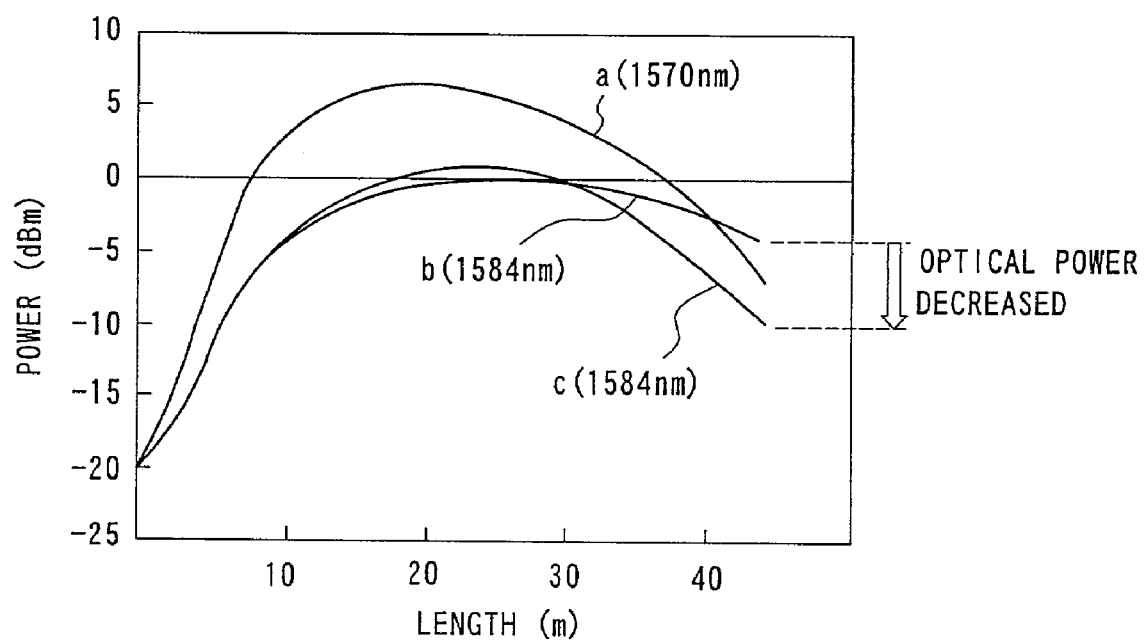
FIG. 35 is a plot for describing effects given by an optical amplifier of the second embodiment.

FIG. 35 plots the output power of optical signals. Solid line a represents the output power of an optical signal at 1570 nm, when two optical signals at different wavelengths, at 1570 nm and 1584 nm, are input. Solid line b represents the output power of an optical signal at 1584 nm, when the above two optical signals are also input. Solid line c represents the output power of an optical signal at 1584 nm, when an optical signal at a wavelength of 1584 nm is input alone.

The vertical and the horizontal axes of the plot of FIG. 35 represent output power (dBm) and the total length of EDFs (m), respectively.

With reference to FIG. 35, it is found that solid line b and solid line c overlap one another at a region of shorter EDF lengths, revealing no difference in the output power of the 1584-nm optical signal regardless of the existence of the 1570-nm optical signal. Such approximate identity of the 1584-nm output power between the above two continues until the EDF length increases up to about 30 m.

At a region of longer EDF lengths, it is found that the output power of the 1584-nm optical signal takes lower values in a case where a 1570-nm optical signal is not input (represented by solid line c in FIG. 35) than in a case where the signal is input (represented by solid line b in FIG. 35). When the length of EDFs exceeds 40 m, in particular, the output power drops significantly (here, decreased by 5 dB). Accordingly, while EDFA is amplifying the L-band optical signals, if the optical signal at the shorter wavelength (1570 nm) is stopped, the output power of the optical signal at the longer wavelength (1584 nm) is significantly decreased.

In this manner, if EDFs are too long, the output power of an optical signal at the longer wavelength varies depending on the existence of an optical signal at the shorter wavelength. If an optical signal at the shorter wavelength is input, it is possible for a receiver to detect an optical signal at the longer wavelength, but once the shorter-wavelength optical signal is stopped, the output power of the longer-wavelength optical signal is decreased, thereby making it impossible for the receiver to detect the longer-wavelength optical signal. The receiver thus requires some counter measures for this.

In the meantime, since it is possible to reduce the EDF length in the present embodiment, the output power of an optical signal at the longer wavelength (1584 nm) can maintain a uniform level, regardless of the existence of an optical signal at the shorter wavelength. Therefore, the receiver requires no such countermeasures as described above to reliably detect the optical signal at the longer wavelength. As a result, the problem that a receiver cannot detect the longer-wavelength optical signal because of its lowered output power level is successfully removed.

Even if L-band optical amplifier 56B of the present embodiment exhibits any gain tilt due to a manufacturing error of optical filter 2 or the like, it is still possible to compensate for the gain tilt in a manner similar to that described in the first embodiment.

Accordingly, an optical amplifier of the present embodiment will bring about an advantage of eliminating various problems caused by increasing EDF length, since the lengths of the EDFs of L-band EDFA 56B of the present embodiment are significantly short.

The present embodiment is advantageous, in particular, in that the problem is resolved that EDFs having increased lengths decrease the output power of optical signals at longer wavelengths in cases where only optical signals at shorter wavelengths are input, in comparison with cases where optical signals at longer wavelengths and at shorter wavelengths are both input.

Note that the description was made on L-band optical amplifier 56B in the second embodiment, and the similar technological principle can be utilized to prepare L$^+$-band optical amplifier 56D for amplifying optical signals at wavelengths in the L$^+$-band, from 1610 to 1650 nm. At this time, the wavelength gain characteristic of EDF 1 at an inversion rate of 0.3 to 1.0 should be used. Moreover, it is also possible to combine L-band optical amplifier 56B with an L$^+$-band optical amplifier 56D into an L-band optical amplifier that amplifies multiple optical signals at wavelengths of 1570 to 1650 nm.

Further, in the forgoing preferred embodiments, S-band optical amplifier 56C is employed in a wavelength-division multiplexing optical transmission system. The present invention, however, should by no means be limited to this, and is also applicable to an optical transmission system that transmits only optical signals in the S-band. Likewise, in the second embodiment, L-band optical amplifier 56B is employed in a wavelength-division multiplexing optical transmission system. The present invention, however, should by no means be limited to this, and is also applicable to an optical transmission system that transmits only optical signals in the L-band.

Furthermore, the present invention should by no means be limited to the above-illustrated embodiment, but various changes or modifications may be suggested without departing from the gist of the invention.

What is claimed is:

1. An optical amplifier which amplifies optical signals at a range of wavelengths from 1450 to 1530 nm, said optical amplifier comprising:
    a plurality of erbium-doped fibers; and
    a plurality of optical filters, each of which is interposed between the individual erbium-doped fibers, said optical filters are configured so that a total of the transmission characteristics, which is a sum of the transmission characteristics of each of said optical filters, is obtained by inverting a wavelength gain characteristic of said erbium-doped fibers in the 1450 to 1530 nm band and shifting the inverted characteristic in a direction as to increase a transmittance rate as a wavelength increases.

2. An optical amplifier as set forth in claim 1, wherein each one of said optical filters has a transmission characteristic such that it transmits a pump beam, equalizes optical signal gain across the 1450 to 1530 nm band, and blocks amplified spontaneous emission at wavelengths longer than 1530 nm.

3. An optical amplifier which amplifies optical signals at a range of wavelengths from 1570 to 1650 nm, said optical amplifier comprising:
    a plurality of erbium-doped fibers; and
    a plurality of optical filters, each of which is interposed between the individual erbium-doped fibers, said optical filters are configured so that a total of the transmission characteristics, which is a sum of the transmission characteristics of each of said optical filters, is obtained by inverting a wavelength gain characteristic of said erbium-doped fibers in the 1570 to 1650 nm band and shifting the inverted characteristic in a direction as to increase a transmittance rate as a wavelength increases.

4. An optical amplifier as set forth in claim 3, wherein each one of said optical filters has a transmission characteristic such that it transmits a pump beam, equalizes optical signal gain across the 1570 to 1650 nm band, and blocks amplified spontaneous emission at wavelengths shorter than 1570 nm.

5. An optical amplifier as set forth in claim 1, wherein said erbium-doped fibers number four, each of said erbium-doped fibers having a length of 4 m.

6. An optical amplifier as set forth in claim 3, wherein said erbium-doped fibers number four, each of said erbium-doped fibers having a length of 4 m.

7. An optical amplifier as set forth in claim 1, wherein said wavelength gain characteristic, which is to be inverted and shifted, is that which appears at an inversion rate of 0.8 to 1.0.

8. An optical amplifier as set forth in claim 3, wherein said wavelength gain characteristic, which is to be inverted and shifted, is that which appears at an inversion rate of 0.8 to 1.0.

9. An optical amplifier as set forth in claim 1, wherein said optical filters are one of such sets as of dielectric multilayer filters, etalon filters, fiber grating filters, rare-earth doped fiber filters, and active gain equalizers, or any combination of the sets.

10. An optical amplifier as set forth in claim 3, wherein said optical filters are one of such sets as of dielectric multilayer filters, etalon filters, fiber grating filters, rare-earth doped fiber filters, and active gain equalizers, or any combination of the sets.

11. An optical amplifier as set forth in claim 1, wherein said erbium-doped fibers are equal in number to that said optical filters.

12. An optical amplifier as set forth in claim 3, wherein said erbium-doped fibers are equal in number to that said optical filters.

13. An optical amplifier as set forth in claim 1, wherein said optical filters are lower in number by 1 than that of said erbium-doped fibers.

14. An optical amplifier as set forth in claim 3, wherein said optical filters are lower in number by 1 than that of said erbium-doped fibers.

15. An optical amplifier as set forth in claim 1, wherein said erbium-doped fiber is made from fluoride glass or tellurite glass.

16. An optical amplifier as set forth in claim 3, wherein said erbium-doped fiber is made from fluoride glass or tellurite glass.

17. An optical amplifier as set forth in claim 1, wherein said erbium-doped fiber includes:
   a core doped with erbium; and
   cladding surrounding said core, said cladding being doped with rare-earth ions or transition metal ions so as to absorb 1550 nm-band light emitted from said core.

18. An optical amplifier as set forth in claim 3, wherein said erbium-doped fiber includes:
   a core doped with erbium; and
   cladding surrounding said core, said cladding being doped with rare-earth ions or transition metal ions so as to absorb 1550 nm-band light emitted from said core.

19. An optical amplifier as set forth in claim 1, wherein said erbium-doped fiber includes:
   a core doped with erbium; and
   cladding surrounding said core, said cladding being doped with any one of the group comprising Tm, Sm, Dy, Tb, Nd, Pm, Pr, Co, and Cu, so as to absorb 1550 nm-band light emitted from said core.

20. An optical amplifier as set forth in claim 3, wherein said erbium-doped fiber includes:
   a core doped with erbium; and cladding surrounding said core, said cladding being doped with any one of the group comprising Tm, Sm, Dy, Tb, Nd, Pm, Pr, Co, and Cu, so as to absorb 1550 nm-band light emitted from said core.

21. An optical amplifier as set forth in claim 1, further comprising a couple of pump beam emitters, each disposed prior to and subsequent to a set of said plural erbium-doped fibers, for emitting a pump beam at a wavelength of 980 nm.

22. An optical amplifier as set forth in claim 3, further comprising a couple of pump beam emitters, each disposed prior to and subsequent to a set of said plural erbium-doped fibers, for emitting a pump beam at a wavelength of 980 nm.

23. An optical amplifier as set forth in claim 22, further comprising another pump beam emitter, interposed between any two of said plural erbium-doped fibers, for emitting a pump beam at a wavelength of 980 nm.

24. A optical signal transmission system, comprising an optical amplifier as set forth in claim 1.

25. A optical signal transmission system, comprising an optical amplifier as set forth in claim 3.

26. A method for producing an optical amplifier for compensating for gain tilts as set forth in claim 1, said method comprising any one of the following steps of:
   adjusting the length of at least one of said erbium-doped fibers;
   adjusting the temperature of at least one of said erbium-doped fibers;
   adjusting the pressure on at least one of said erbium-doped fibers; and
   disposing a Raman amplifier prior to said optical amplifier.

27. A method for producing an optical amplifier for compensating for gain tilts as set forth in claim 3, said method comprising any one of the following steps of:
   adjusting the length of at least one of said erbium-doped fibers;
   adjusting the temperature of at least one of said erbium-doped fibers;
   adjusting the pressure on at least one of said erbium-doped fibers; and
   disposing a Raman amplifier prior to said optical amplifier.

28. A method for producing an optical amplifier for compensating for gain tilts as set forth in claim 1, said method comprising the step of adjusting the length, the temperature, and/or the pressure, of the last one or the foremost one of said plural erbium-doped fibers.

29. A method for producing an optical amplifier for compensating for gain tilts as set forth in claim 3, said method comprising the step of adjusting the length, the temperature, and/or the pressure, of the last one or the foremost one of said plural erbium-doped fibers.

30. An optical amplifier, comprising:
   a plurality of rare-earth element doped fibers;
   a plurality of optical filters each of which is interposed between the individual rare-earth doped fibers, each respective individual optical filter having a transmission characteristic that is identical to an inversion of a wavelength gain characteristic of the one of said rare-earth element doped fibers which precedes the respective optical filter; and
   said optical filters are configured so that a total of the transmission characteristics, which is a sum of the transmission characteristics of each of said optical filters, is obtained by inverting a wavelength gain characteristic of said rare-earth element doped fibers and shifting the inverted characteristic in a direction as to increase a transmission rate as a wavelength increases.

31. An optical amplifier, comprising:
   a plurality of rare-earth element doped fibers; and
   a plurality of optical filters, each of which is interposed between the individual rare-earth element doped fibers, said optical filters are configured so that a total of the transmission characteristics, which is a sum of the transmission characteristics of each of said optical filters, is obtained by inverting a wavelength gain characteristic of said rare-earth element doped fiber and shifting the inverted characteristic in a direction as to increase a transmittance rate as a wavelength increases.

32. An optical amplifier, comprising:

optical fibers arranged in series;

optical filters, each respective optical filter being positioned between two adjacent optical fibers in the series of optical fibers, wherein the optical filters are configured so that a sum of the transmission characteristics of each of the optical filters is obtained by inverting a wavelength gain characteristic of the optical fibers and shifting the inverted characteristic in a direction as to increase a transmittance rate as a wavelength increases.

33. An optical amplifier, comprising:

optical fibers arranged in series; and optical filters, each respective optical filter being positioned between two adjacent optical fibers in the series of optical fibers, wherein the optical filters are configured so that a sum of the transmission characteristics of each of said optical filters is obtained by inverting a wavelength gain characteristic of the optical fibers and shifting the inverted characteristic in a direction as to increase a transmittance rate as a wavelength increases, wherein the transmission characteristics of each of said optical filters is set such that loss of a post-stage optical filter is smaller than loss of a pre-stage optical filter.

34. An optical amplifier, comprising:

optical fibers arranged in series; and optical filters, each respective optical filter being positioned between two adjacent optical fibers in the series of optical fibers, wherein the optical filters are configured so that a sum of the transmission characteristics of each of said optical filters is obtained by inverting a wavelength gain characteristic of the optical fibers and shifting the inverted characteristic in a direction as to increase a transmittance rate as a wavelength increases, wherein the transmission characteristics of each of said optical filters is set such that loss of a post-stage optical filter is larger than loss of a pre-stage optical filter.

* * * * *

UNITED STATES PATENT AND TRADEMARK OFFICE
CERTIFICATE OF CORRECTION

PATENT NO. : 7,072,100 B2  
APPLICATION NO. : 10/103751  
DATED : July 4, 2006  
INVENTOR(S) : Masato Nishihara et al.

It is certified that error appears in the above-identified patent and that said Letters Patent is hereby corrected as shown below:

Title Page, Col. 2, line 1, delete "et al." under refer cited and insert --et al., ….. 359/124--.

Col. 25, line 4, delete "1.0." and insert --10.--, therefor.

Signed and Sealed this

Thirtieth Day of January, 2007

JON W. DUDAS  
*Director of the United States Patent and Trademark Office*